(12) United States Patent
Kakita et al.

(10) Patent No.: US 9,990,534 B2
(45) Date of Patent: Jun. 5, 2018

(54) IMAGE PROCESSING DEVICE AND IMAGE PROCESSING METHOD

(71) Applicant: FUJITSU TEN LIMITED, Kobe-shi, Hyogo (JP)

(72) Inventors: Naoshi Kakita, Kobe (JP); Atsushi Mino, Kobe (JP); Yuuki Matsumoto, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 23 days.

(21) Appl. No.: 15/258,519

(22) Filed: Sep. 7, 2016

(65) Prior Publication Data

US 2017/0116461 A1 Apr. 27, 2017

(30) Foreign Application Priority Data

Oct. 27, 2015 (JP) ................. 2015-211099

(51) Int. Cl.
| | |
|---|---|
| *G06K 9/00* | (2006.01) |
| *G06K 9/46* | (2006.01) |
| *G06K 9/74* | (2006.01) |
| *G06T 5/00* | (2006.01) |
| *G06T 7/73* | (2017.01) |
| *G06K 9/62* | (2006.01) |
| *G06K 9/48* | (2006.01) |

(52) U.S. Cl.
CPC ..... *G06K 9/00201* (2013.01); *G06K 9/00671* (2013.01); *G06K 9/00785* (2013.01); *G06K 9/4604* (2013.01); *G06K 9/4671* (2013.01); *G06K 9/6218* (2013.01); *G06K 9/74* (2013.01); *G06T 5/00* (2013.01); *G06T 7/73* (2017.01); *G06K 2009/487* (2013.01); *G06T 2200/28* (2013.01); *G06T 2207/10016* (2013.01); *G06T 2207/30261* (2013.01); *G06T 2207/30264* (2013.01)

(58) Field of Classification Search
CPC .... G06K 9/00671; G06K 9/18; G06K 9/2018; G06K 9/2063; G06T 19/006; G06T 7/74; H04N 5/33; H04N 5/30; G09G 5/00; G02B 1/00; G02B 5/20; G02B 5/26; G02B 5/208; G02B 5/22; C08J 3/201; C08J 3/226; G01N 21/88; G01N 21/90; G01N 21/9081; G01N 21/9027; G01N 21/958

See application file for complete search history.

(56) References Cited

FOREIGN PATENT DOCUMENTS

JP 2006-268097 A 10/2006

*Primary Examiner* — Duy M Dang
(74) *Attorney, Agent, or Firm* — Oliff PLC

(57) ABSTRACT

There is provided an image processing device. A feature point acquiring unit acquires a plurality of feature points of objects of each frame image. A grouping unit performs a grouping process of dividing the feature points into groups corresponding to the individual objects. A masking unit performs a masking process of excluding feature points included in some areas of the frame image. A highlighting-image generating unit generates highlighting images for highlighting objects of the frame image corresponding to the feature point groups. A superimposed-image generating unit superimposes the highlighting images on the frame image, thereby generating a superimposed image.

9 Claims, 20 Drawing Sheets

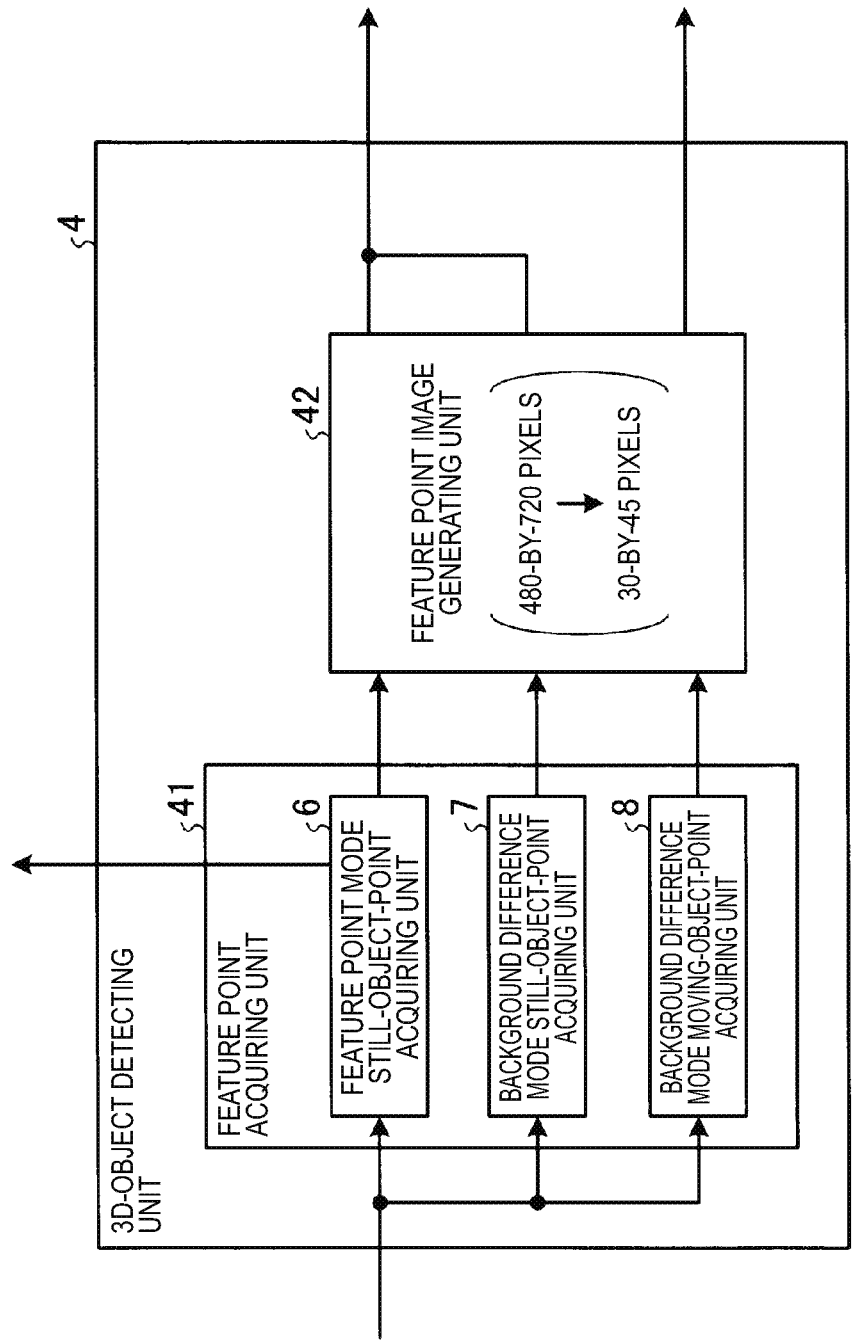

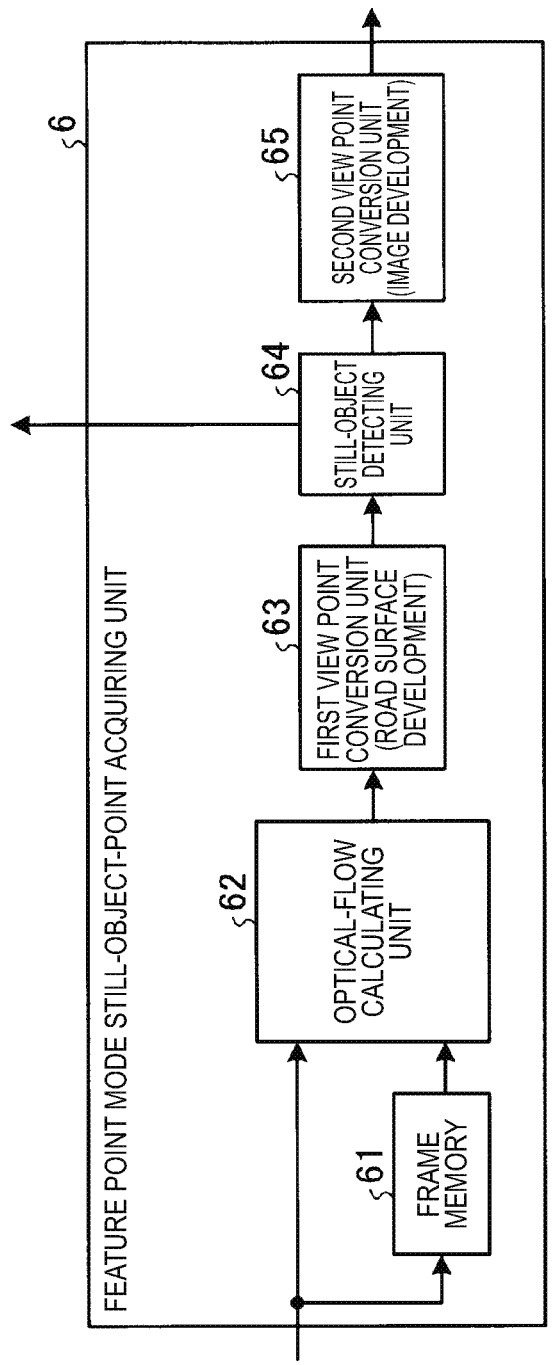

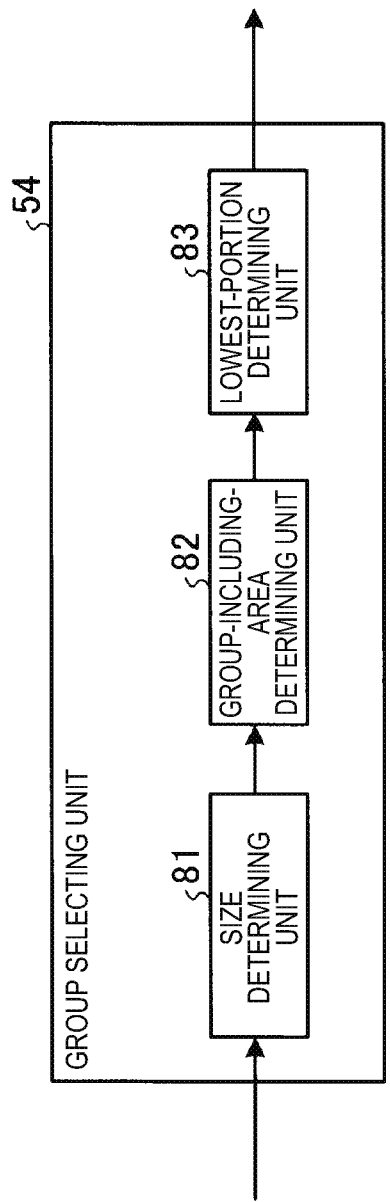

IMAGE PROCESSING DEVICE AND IMAGE PROCESSING METHOD

TECHNICAL FIELD

The present invention relates to an image processing device and an image processing method.

RELATED ART

In the related art, there are object detecting devices configured to extract the edges of objects existing in a plurality of frame images acquired by a camera, and calculate the moving velocities of the edges in the left-right direction in the frame images, and detect road boundaries existing in the frame images, on the basis of the moving velocities of the edges in the left-right direction (see Patent Document 1, for instance).

In general, this type of object detecting device acquires a plurality of feature points of objects, such as three-dimensional objects, included in each frame image, from frame images sequentially input from an imaging device, and performs a masking process of excluding feature points included in a portion of the frame image corresponding to an area relatively far from a camera, from the acquired feature points.

Thereafter, the object detecting device performs a grouping process of dividing a plurality of feature points remaining after the masking process into groups according to objects, and notifies a user that those objects exist, for example, by superimposing border images surrounding the feature point groups on corresponding objects of the frame image.

Patent Document 1: Japanese Patent Application Publication No. 2006-268097A

However, such devices may provide frame images including border images surrounding portions of objects, not the entire objects, to users. It cannot be said that such frame images are high-quality information for notifying users that those objects exist.

SUMMARY

It is therefore an object of the present invention to provide an image processing device and an image processing method capable of improving the quality of information for notifying existence of objects to a user.

An image processing device according to the present invention includes a feature point acquiring unit, a grouping unit, a masking unit, a highlighting-image generating unit, and a superimposed-image generating unit. The feature point acquiring unit acquires a plurality of feature points of objects included in each frame image, from frame images sequentially input from an imaging device. The grouping unit performs a grouping process of dividing the plurality of feature points into groups according to the objects, and outputs the feature points. The masking unit performs a masking process of excluding feature points included in some areas of the frame image, from the plurality of input feature points, and outputs the remaining feature points. In the case where the feature point acquiring unit inputs the feature points to the grouping unit, and the grouping unit outputs the feature points to the masking unit, and the masking unit outputs feature point groups, the highlighting-image generating unit generating highlighting images for highlighting object of the frame image corresponding to the feature point groups. The superimposed-image generating unit superimposes the highlighting images generated by the highlighting-image generating unit, on the frame image, thereby generating a superimposed image, and outputs the superimposed image.

The image processing device and the image processing method according to the present invention can improve the quality of information for notifying existence of objects to a user.

BRIEF DESCRIPTION OF THE DRAWINGS

Exemplary embodiments of the present invention will be described in detailed based on the following figures, wherein:

FIG. 6 is a functional block diagram illustrating the configuration of a 3D-object detecting unit according to the embodiment;

FIG. 7 is a functional block diagram illustrating the configuration of a feature point mode still-object-point acquiring unit according to the embodiment;

FIG. 17 is a functional block diagram illustrating the configuration of a group selecting unit according to the embodiment;

DETAILED DESCRIPTION

Hereinafter, an image processing device and an image processing method according to an embodiment of the present invention will be described in detail with reference to the accompanying drawings. However, the present invention is not limited to the following embodiment.

Hereinafter, a case where the image processing device according to the embodiment performs image processing on images (hereinafter, referred to as "frame images") acquired by consecutively imaging the rear side of a vehicle by an in-vehicle camera, and outputs the processed frame images to a display device provided inside the vehicle will be described as an example.

However, images which are subjected to image processing by the image processing device according to the embodiment are not limited to images of the rear side of the vehicle, and may be images of the front, left, or right side of the vehicle. Also, an imaging device which transmits images to the image processing device according to the embodiment is not limited to the in-vehicle camera, and may be a camera module mounted on a mobile device such as a smart phone, a digital camera, a security camera installed on the street or at home, or the like.

Figure 1:
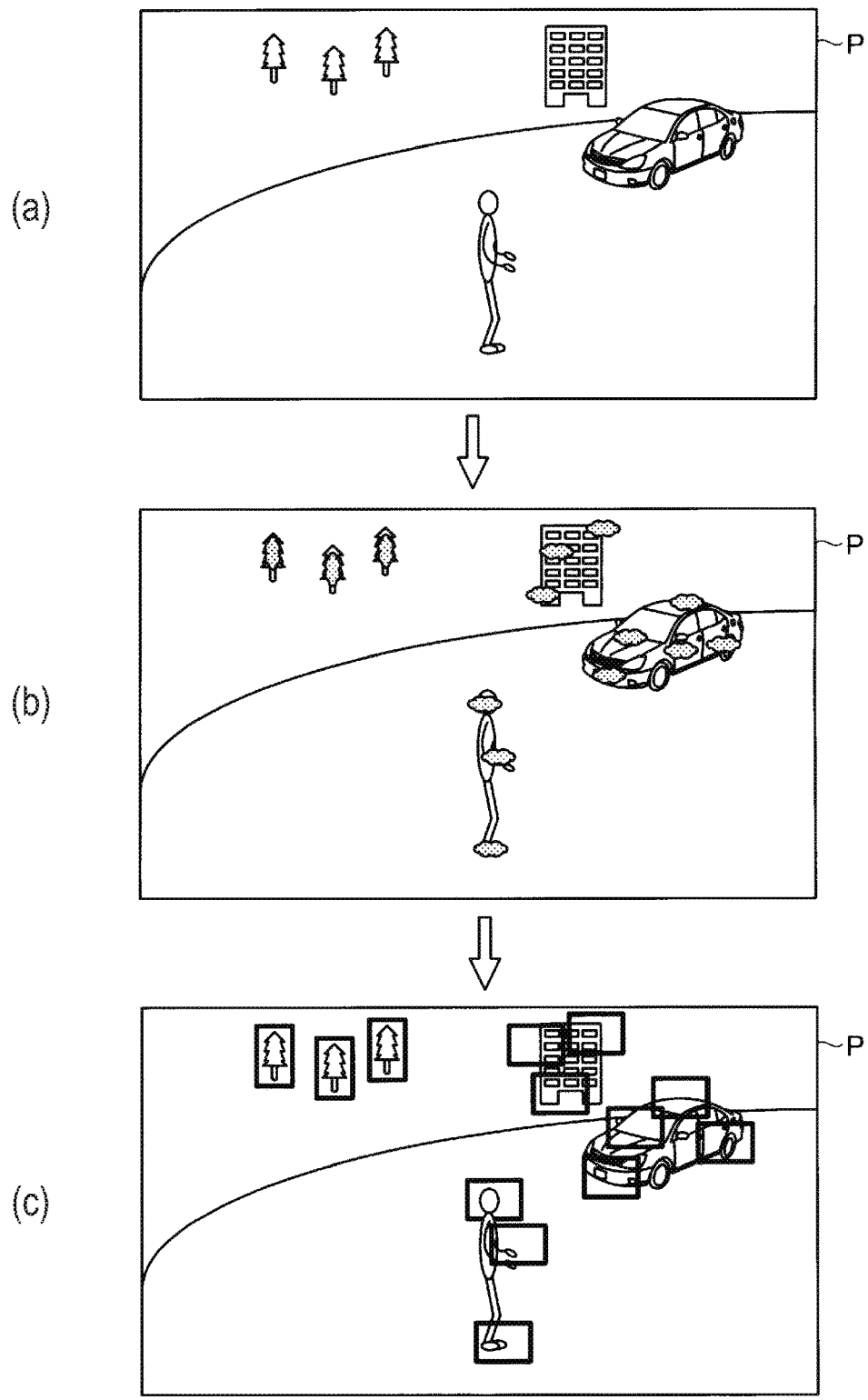
FIG. 1 is an explanatory view illustrating a first comparative example of an image processing method according to an embodiment.
Figure 2:
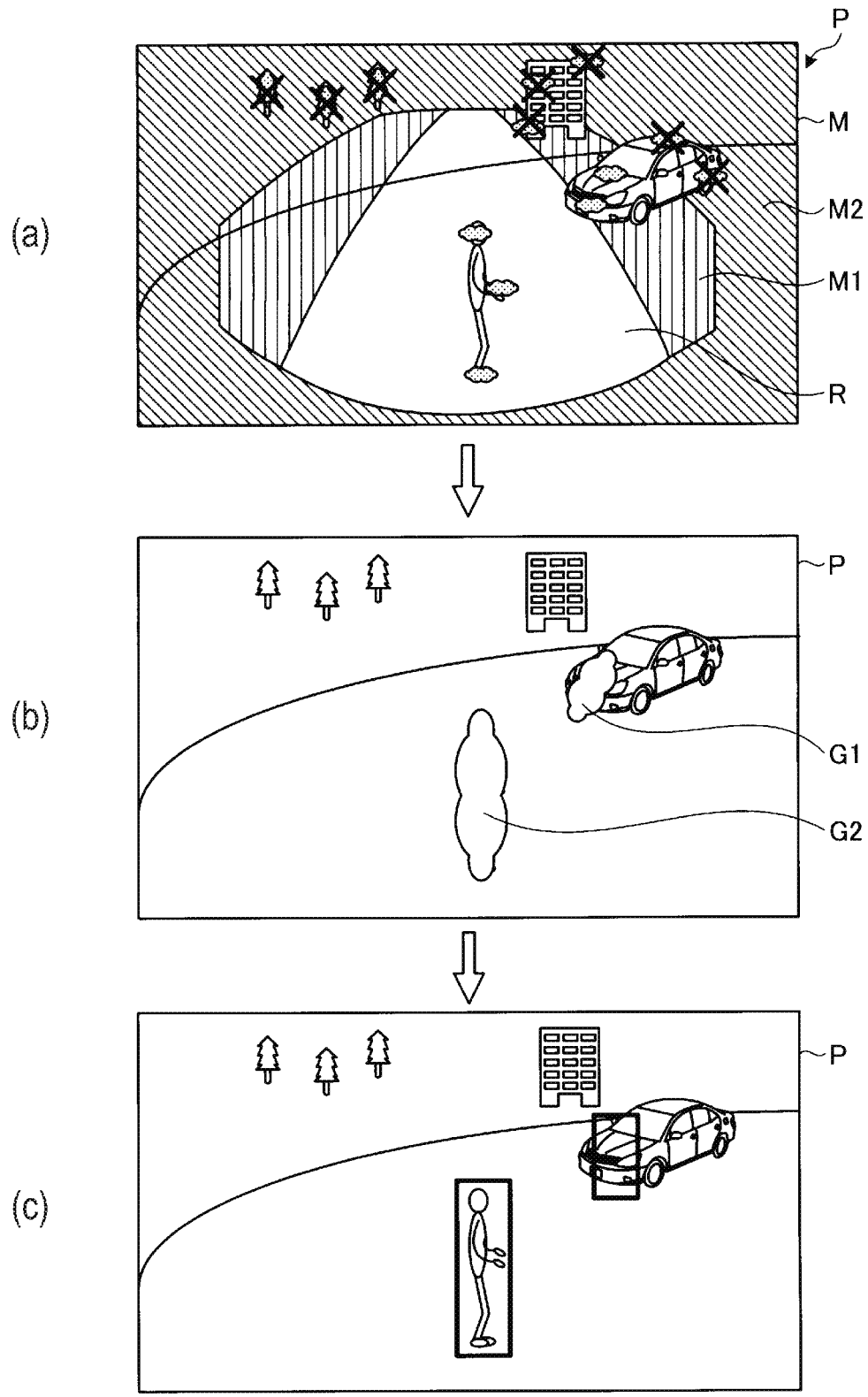
FIG. 2 is an explanatory view illustrating a second comparative example of the image processing method according to the embodiment.
Figure 3:
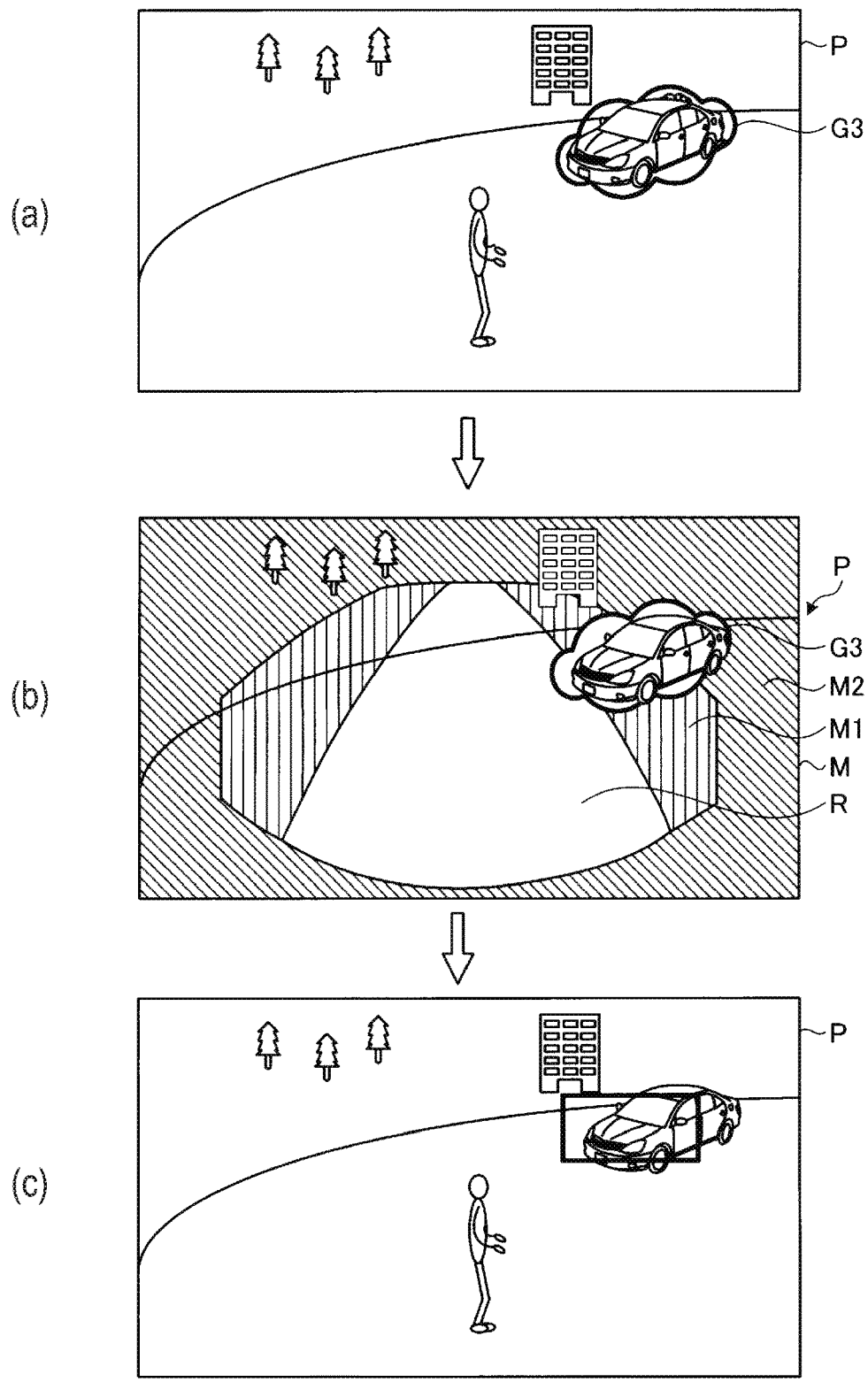
FIG. 3 is an explanatory view illustrating the image processing method according to the embodiment.
Figure 4:
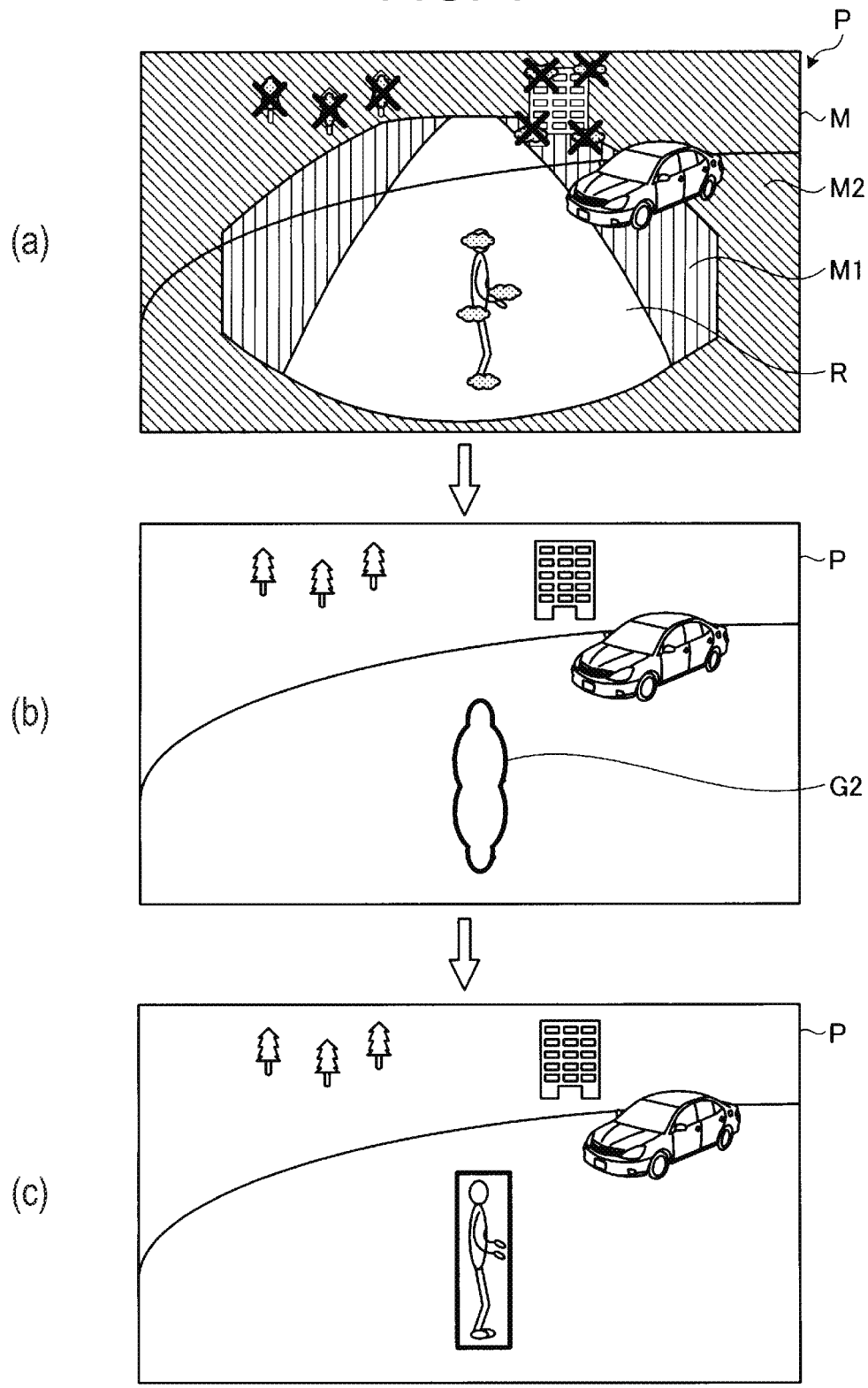
FIG. 4 is another explanatory view illustrating the image processing method according to the embodiment.

Hereinafter, comparative examples of the image processing method according to the embodiment will be first described, and then the image processing method and the image processing device according to the embodiment will be described. FIG. 1 is an explanatory view illustrating a first comparative example of the image processing method according to the embodiment, and FIG. 2 is an explanatory view illustrating a second comparative example of the image processing method according to the embodiment. Also, FIGS. 3 and 4 are explanatory views illustrating the image processing method according to the embodiment.

In the first comparative example, in a case where a frame image P includes objects such as a standing person (a still object), a different vehicle (a moving object), a building (a still object), and trees (still objects) as shown in (a) of FIG. 1, as shown in (b) of FIG. 1, feature points of the individual objects (hereinafter, representatively referred to as "three-dimensional objects" are acquired from the frame image P.

Here, the feature points mean points remarkable in the appearances of the individual three-dimensional objects, such as the edges of the three-dimensional objects included in the frame image P. Such feature points are acquired by a 3D-object detecting mode such as a so-called feature point mode or a so-called background difference mode. The feature point mode and the background difference mode will be described below with a description the image processing device.

In the first comparative example, subsequently, as shown in (c) of FIG. 1, border images (rectangular borders shown by thick lines in (c) of FIG. 1) for surrounding areas where the density of feature points is high are generated, and are superimposed on the frame image P, and the superimposed image is output to a display device. According to the first comparative example, it is possible to notify a user that there are the obstacles on the rear side of the vehicle. However, since the number of border images which are superimposed on the frame image P is too large, the amount of obstacle information to be notified to the user is too large, and it is hard for the user to view the information.

As an example of a method for solving the above described problem, there is an image processing method of the second comparative example shown in FIG. 2. In the second comparative example, after the plurality of feature points shown in (b) of FIG. 1 is acquired, a masking process is performed on the feature points, and feature points remaining after the masking process are grouped. Therefore, the amount of information on obstacles to be notified to the user is suppressed from becoming too large.

Specifically, in the second comparative example, after the feature points have been acquired from the frame image P, as shown in (a) of FIG. 2, a mask M is applied to the frame image P. The mask M excludes still-object feature points acquired in side areas M1 extending from the left and right ends of the center area R of the frame image P corresponding to the front of the rear of the vehicle to outer positions apart from both ends of the center area R by a predetermined distance in the left-right direction, without excluding still-object feature points and moving-object feature points acquired in the center area R.

Further, the mask M excludes still-object feature points and moving-object feature points acquired a far area M2 positioned on the outer side from the center area R and the side areas M1 in the frame image P. The areas from which the feature points are excluded by the mask M shown in (a) of FIG. 2 are examples, and the present invention is not limited thereto.

As the result of the masking process, in the center area R of the frame image P, still-object feature points and moving-object feature points remain, and in the side areas M1, moving-object feature points remain. In short, by the masking process, from the far area M2, every feature point is excluded, and from the side areas M1, the still-object feature points are selectively excluded.

Therefore, according to the second comparative example, in a case of the frame image P shown in (a) of FIG. 1, it is possible to exclude the feature points of the building and the trees which are far away and have less need to be notified to the user in terms of traveling safety, from 3D-object detection materials, by a masking process.

Also, at that moment, even if the vehicle reverses, the vehicle does not collide with the different vehicle moving in a side area M1. However, after that, the vehicle may collide with the different vehicle. According to the second comparative example, it is possible to keep the different vehicle as a 3D-object detection material.

In the second comparative example, subsequently, the plurality of feature points remaining after the masking process is subjected to a grouping process, thereby being divided into groups G1 and G2 corresponding to individual three-dimensional objects as shown in (b) of FIG. 2. Here, the group G1 is a group of moving feature points. The group G2 is a group of the feature points of the standing person.

Thereafter, in the second comparative example, border images for surrounding the groups G1 and G2 shown in (c) of FIG. 2 are generated. Subsequently, as shown in (c) of FIG. 2, the border images (rectangular borders shown by thick lines in (c) of FIG. 2) are superimposed on the frame image P. According to the second comparative example, in a case where there is a possibility that, if the vehicle reverses, the vehicle may collide with a three-dimensional object, a border image for surrounding the corresponding object is selectively superimposed. Therefore, it is possible to suppress the amount of obstacle information to be provided to the user from becoming too large.

However, in the second comparative example, since the masking process is uniformly performed on all feature points acquired from the frame image, and then the grouping process is performed, a frame image including a border image surrounding a portion of the moving object, not the entire moving object, may be provided to the user.

Specifically, if a masking process is performed on the feature points acquired from the moving different vehicle, as shown in (a) of FIG. 2, and then a grouping process is performed on feature points remaining after the masking process, as shown in (b) of FIG. 2, the feature point group G1 of the different vehicle is composed of only the feature points of the front portion of the different vehicle.

Therefore, in a case where a border image for surrounding the group G1 is superimposed on the frame image P, as shown in (c) of FIG. 2, in the frame image P, the front portion of the different vehicle of a frame image P is surrounded by the border image. It cannot be said that the frame image P having such border images superimposed thereon is high-quality information for notifying the user that the obstacles exist.

For this reason, with respect to the plurality of feature points of the three-dimensional objects acquired from the frame image P, the image processing method according to the embodiment sequentially performs a grouping process and a masking process on the moving-object feature points, and subsequently performs a masking process and a grouping process on the still-object feature points.

Specifically, the image processing method according to the embodiment (hereinafter, referred to as the "present image processing method") acquires a plurality of feature points of the different vehicle which is a moving object, from the frame image P, as shown in (a) of FIG. 3, and performs a grouping process on the acquired feature points. As a result, a feature point group G3 corresponding to the different vehicle occupies an area including most of the different vehicle.

Thereafter, the present image processing method performs a masking process on the feature point group G3 obtained as the result of the grouping process, as shown in (b) of FIG. 3. At this time, a mask M identical to the mask M shown in (a) of FIG. 2 is applied. However, even though only a portion of an area occupied by a group overlaps an area from which any feature point is not excluded, the feature points of the corresponding area are kept without being excluded. Therefore, the feature points of the group G3 shown in (b) of FIG. 3 are kept without being excluded.

Subsequently, the present image processing method generates a border image for surrounding the area of the frame image P occupied by the group G3, as an area where there are the feature points of the different vehicle, and superimposes the border image (a rectangular border shown by a thick line in (c) of FIG. 3) on the frame image P as shown in (c) of FIG. 3.

As described above, although most of the different vehicle is included in a side area M1, the present image processing method can generate the border image for surrounding most of the different vehicle. Therefore, the present image processing method can generate a superimposed frame image P including border images having quality higher than that of the second comparative example, as information for notifying the user that there are the obstacles.

Also, in a case of generating border images for surrounding still objects included in the frame image P, the present image processing method generates border images in the same way as that of the comparative examples. Specifically, in a case of generating border images for surrounding still objects included in the frame image P, first, as shown in (a) of FIG. 4, the present image processing method performs a masking process using the mask M, on the feature points acquired from the still objects, such as the person, the building, and the trees, included in the frame image P.

Thereafter, as shown in (b) of FIG. 4, the present image processing method performs a grouping process of grouping the feature points of the person remaining after the masking process, as a group G2. Subsequently, the present image processing method generates a border image for surrounding the group G2, and superimposes the border image (a rectangular border shown by a thick line in (c) of FIG. 4) on the frame image P.

In this way, with respect to the still objects included in the frame image P, the present image processing method can superimpose a border image on the person existing in front of the rear of the vehicle and having a risk of colliding with the vehicle if the vehicle reverses, without superimposing border images on the building and the trees existing far away and unlikely to collide with the vehicle.

Figure 5:
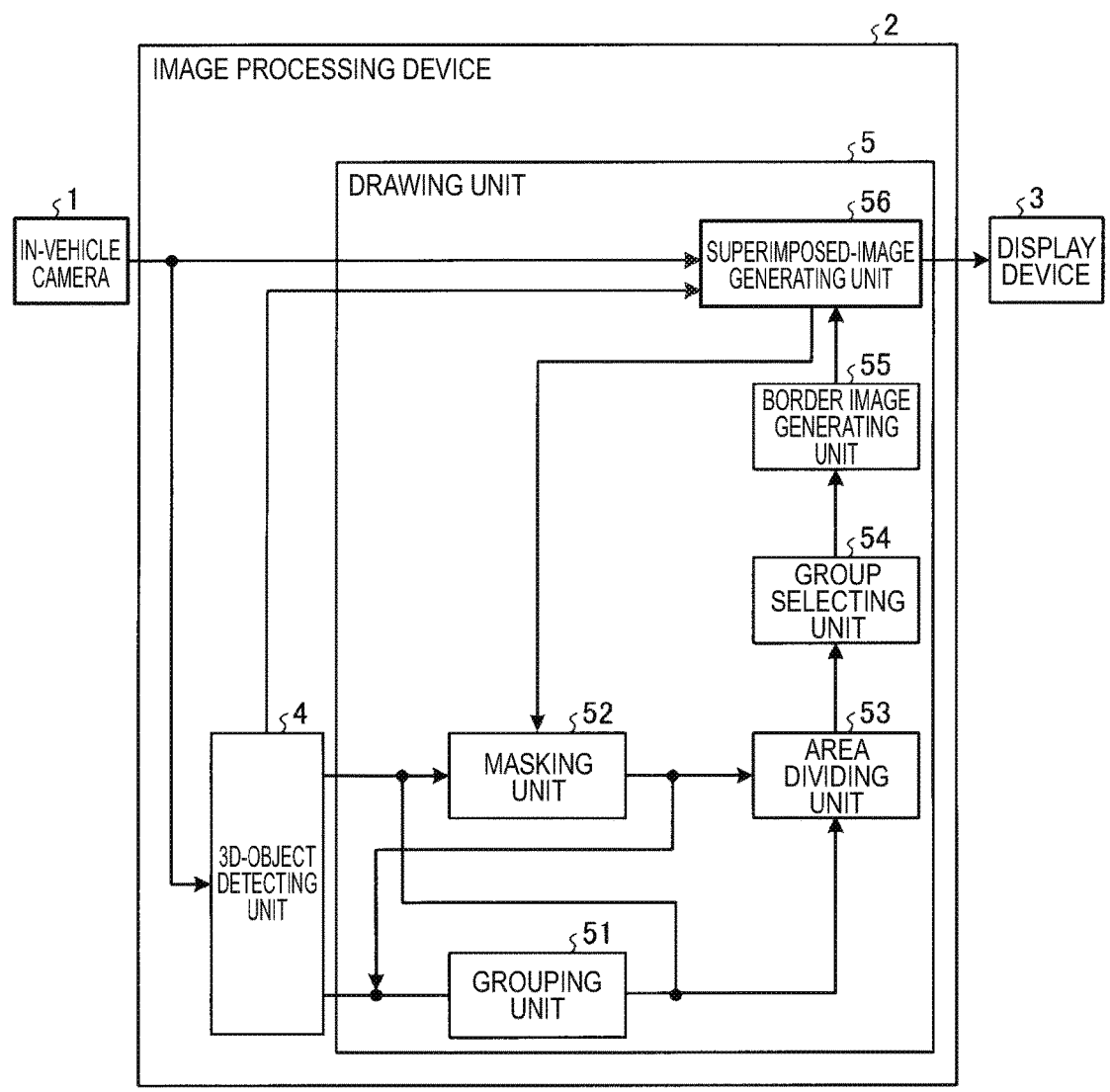
FIG. 5 is a functional block diagram illustrating the configuration of an image processing device according to the embodiment.

Now, with reference to FIG. 5, an image processing device 2 according to the embodiment will be described. FIG. 5 is a functional block diagram illustrating the configuration of the image processing device 2 according to the embodiment. As shown in FIG. 5, the image processing device 2 is connected to an in-vehicle camera 1 for imaging the rear side of a vehicle, and a display device 3 which is installed inside the vehicle.

The image processing device 2 is, for example, a field programmable gate array (FPGA), and includes a 3D-object detecting unit 4 and a drawing unit 5 which are implemented by executing a designed program. The in-vehicle camera 1 records a video of the rear side of the vehicle, and sequentially inputs the frame images P of the video to the 3D-object detecting unit 4 and the drawing unit 5.

The 3D-object detecting unit 4 is a processing unit for detecting still objects and moving objects included in an input frame image P, and separately outputting the still-object detection results and the moving-object detection results to the drawing unit 5. Also, the 3D-object detecting unit 4 performs a process of detecting the movement amount and turning amount of the vehicle on the basis of the frame image P, and outputting the detection results to the drawing unit 5. The details of the 3D-object detecting unit 4 will be described below with reference to FIGS. 6 and 11.

The drawing unit 5 is a processing unit for separately generating border images for surrounding still objects and moving objects included in the frame images P, on the basis of the detection results input from the 3D-object detecting unit 4, and superimposing the border images on the frame image P input from the in-vehicle camera 1, and outputting the superimposed image to the display device 3. The border images are examples of highlighting images for highlighting the still objects and the moving objects included in the frame images P.

Further, the drawing unit 5 performs a process of generating an image of an a guide line estimated as the movement path of the vehicle (an estimated movement line image) on the basis of the detection results of the movement amount and turning amount of the vehicle input from the 3D-object detecting unit 4, and superimposing the estimated movement line image on the frame images P. Also, the drawing unit 5 performs a process of generating an image of a fixed guide line representing an area corresponding to the center area R of the rear side of the vehicle, regardless of the amount of turning of the vehicle, and superimposing the fixed guide line image on the frame image P.

Now, with reference to FIGS. 6 to 11, the configuration and operation of the 3D-object detecting unit 4 will be described. FIG. 6 is a functional block diagram illustrating the configuration of the 3D-object detecting unit 4 according to the embodiment, and FIG. 7 is a functional block diagram illustrating the configuration of a feature point mode still-object-point acquiring unit 6 according to the embodiment.

Figure 8A:
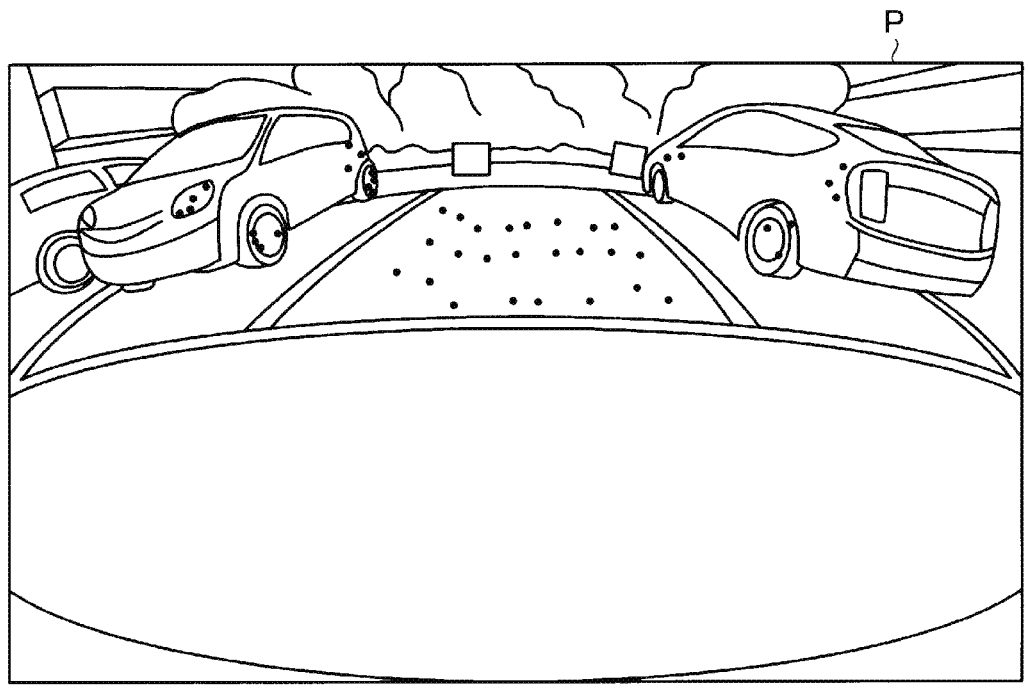
FIGS. 8A and 8B are explanatory views of a feature point mode according to the embodiment.
Figure 8B:
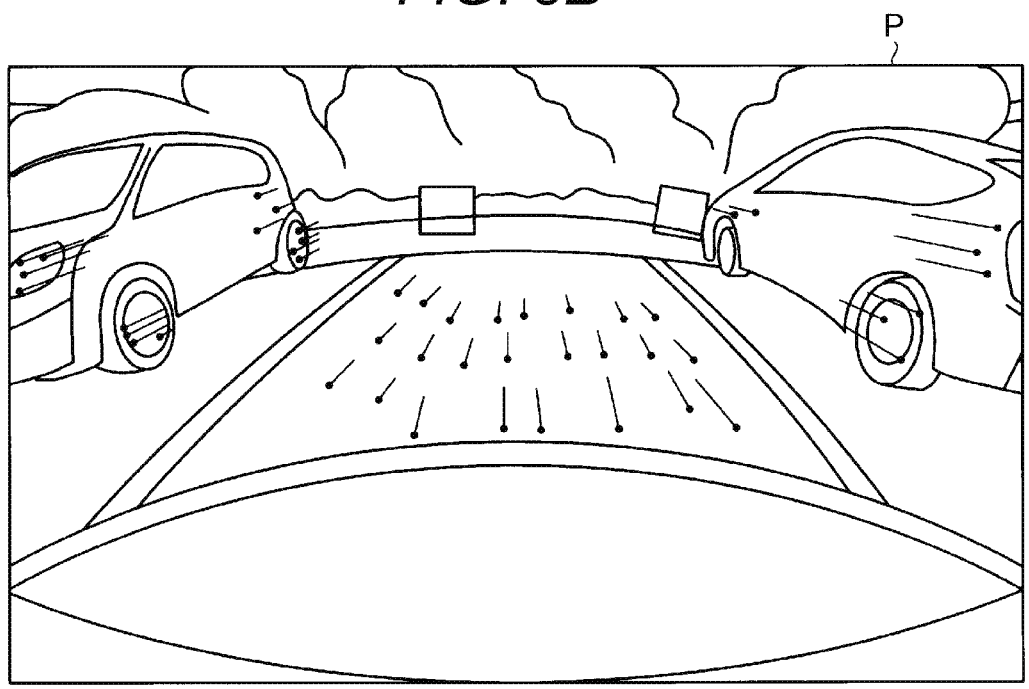
Figure 9:
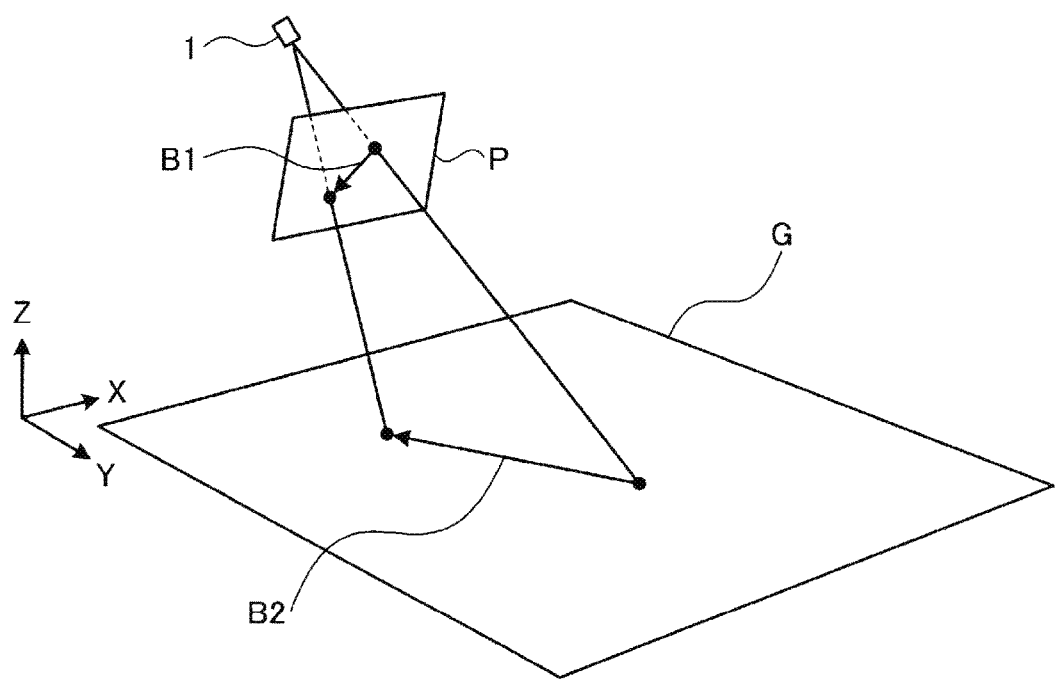
FIG. 9 is another explanatory view of the feature point mode.
Figure 10:
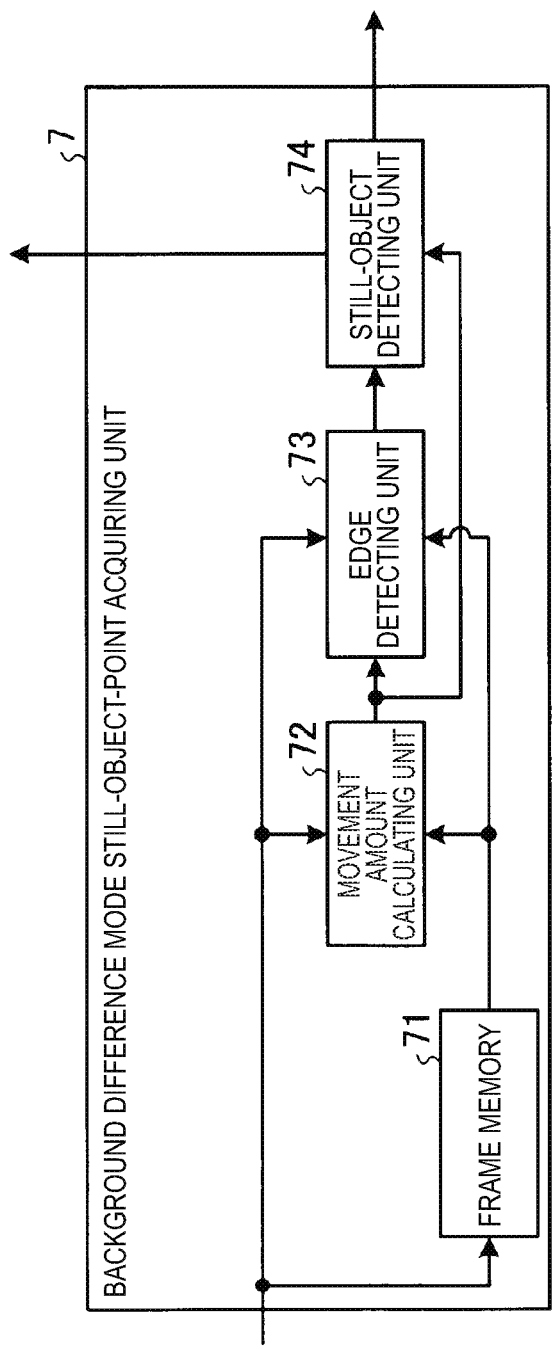
FIG. 10 is a functional block diagram illustrating the configuration of a background difference mode still-object-point acquiring unit according to the embodiment.
Figure 11:
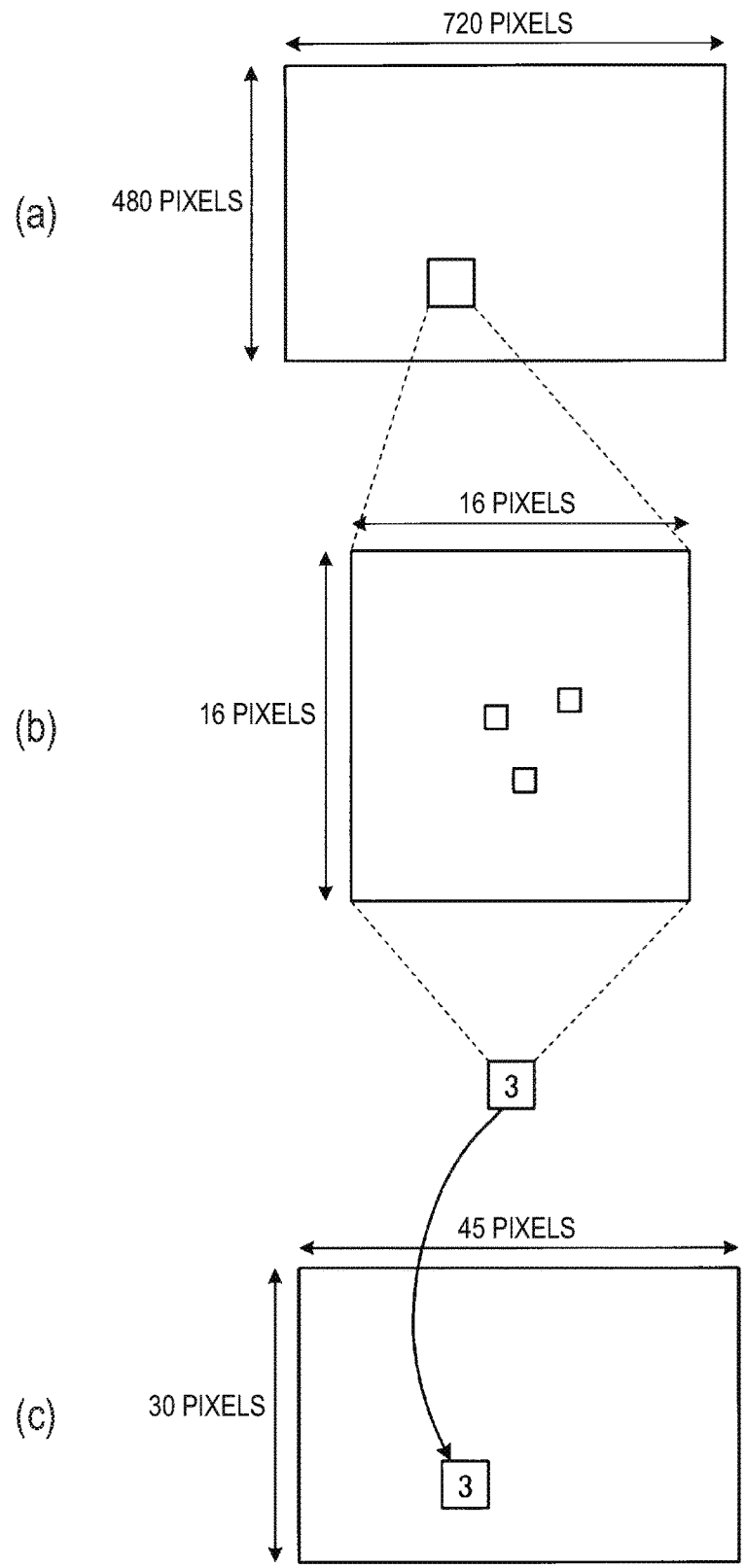
FIG. 11 is an explanatory view illustrating an operation of a feature point image generating unit according to the embodiment.

Also, FIGS. 8A, 8B, and 9 are explanatory views of the feature point mode according to the embodiment, and FIG. 10 is a functional block diagram illustrating the configuration of a background difference mode still-object-point acquiring unit 7 according to the embodiment, and FIG. 11 is an explanatory view illustrating an operation of a feature point image generating unit 42 according to the embodiment.

As shown in FIG. 6, the 3D-object detecting unit 4 includes a feature point acquiring unit 41 and the feature point image generating unit 42. The feature point acquiring unit 41 is a processing unit for acquiring a plurality of feature points of three-dimensional objects included in each frame image P if frame images P are sequentially input from the in-vehicle camera 1.

Also, the feature point acquiring unit 41 includes the feature point mode still-object-point acquiring unit 6, the background difference mode still-object-point acquiring unit 7, and a background difference mode moving-object-point acquiring unit 8. The feature point mode still-object-point acquiring unit 6 is a processing unit for acquiring the feature points of still objects included in each frame image P in the feature point mode, and plotting the acquired feature points, thereby generating an image, and outputting the image to the feature point image generating unit 42.

Specifically, the feature point mode still-object-point acquiring unit 6 is a processing unit for tracking the transition state between frame images P according to movement of the vehicle, on the basis of the feature points, and estimating movement of the vehicle on the basis of feature point movement vectors, thereby estimating the positions of still objects included in each frame image P. As shown in FIG. 7, the feature point mode still-object-point acquiring unit 6 includes a frame memory 61, an optical-flow calculating unit 62, a first view point conversion unit 63, a still-object detecting unit 64, and a second view point conversion unit 65. The frame memory 61 is a memory for sequentially storing frame images P input from the in-vehicle camera 1 in chronological order and sequentially outputting the frame images P to the optical-flow calculating unit 62.

The optical-flow calculating unit 62 is a processing unit for setting sample points on each frame image P, and calculating the movement vectors of the sample points according to movement of the vehicle, as optical flows, and outputting the movement vectors to the first view point conversion unit 63.

For example, the optical-flow calculating unit 62 acquires the latest frame image P shown in FIG. 8B, from the in-vehicle camera 1, and acquires a frame image P of FIG. 8A earlier than the latest frame image P by one frame, from the frame memory 61.

Thereafter, the optical-flow calculating unit 62 sets a plurality of (for example, several hundreds of) sample points (black points in FIG. 8A) in the previous frame image P as shown in FIG. 8A. Subsequently, the optical-flow calculating unit 62 calculates vectors of FIG. 8B representing movements of the sample points between the imaging time of the previous frame image P and the imaging time of the latest frame image P, as optical flows.

In FIG. 8B, lines extending from the black points represent the movement vectors of the sample points, respectively. Returning to FIG. 7, whenever the latest frame image P is input from the in-vehicle camera 1, the optical-flow calculating unit 62 sequentially calculates optical flows, and outputs the optical flows to the first view point conversion unit 63.

The first view point conversion unit 63 is a processing unit for performing road surface development on the optical flows input from the optical-flow calculating unit 62, and outputting the result to the still-object detecting unit 64. Here, road surface development is a process of converting the calculated optical flows on the frame image P into movement vectors (optical flows) on a road surface (on a world coordinate systems).

As shown in FIG. 9, the first view point conversion unit 63 projects optical flows B1 on a frame image P onto the road surface, thereby calculating optical flows B2 on the road surface. The first view point conversion unit 63 calculates the optical flows B2 on the road surface by a conversion algorithm using the installation position and depression angle of the in-vehicle camera 1.

The optical flows B1 on the frame image P of the in-vehicle camera 1 are projected onto a road surface G, thereby being converted into the optical flows B2 on the road surface G. The intersections of the road surface G and extension lines of lines connecting the view point of the in-vehicle camera 1 to the start points of the optical flows B1 on the frame image P become the start points of the optical flows B2 on the road surface G.

Similarly, the intersections of the road surface G and extension lines of lines connecting the view point of the in-vehicle camera 1 and the end points of the optical flows B1 become the end points of the optical flows B2 on the road surface G. The frame image P of FIG. 9 is a conceptual view of the case of converting the optical flows B1 on the frame image P into the optical flows B2 on the road surface G, and does not show a frame image P existing in a real space.

In a case where the road surface G is an X-Y plane and the position of the in-vehicle camera 1 is the origin, the start points and end points of the optical flows B2 on the road surface G can be calculated from X coordinates and Y coordinates. Returning to FIG. 7, the first view point conversion unit 63 outputs the optical flows B2 on the road surface G to the still-object detecting unit 64.

The still-object detecting unit 64 is a processing unit for detecting the positions of the still objects on the road surface G, on the basis of the optical flows B2 on the road surface G input from the first view point conversion unit 63. Specifically, on the basis of the optical flows B2 on the road surface G, the still-object detecting unit 64 calculates the turning amount and movement amount on the road surface G with respect to the vehicle having moved in the period between the imaging times of the frame images P.

Also, on the basis of the turning amount and movement amount of the vehicle and the lengths of the optical flows B2, the still-object detecting unit 64 detects the feature points of the still objects. Subsequently, the still-object detecting unit 64 maps the feature points of the still objects of the frame image P on the road surface G, onto a 3D-object arrangement map composed of 480-by-720 pixels.

At this time, the still-object detecting unit 64 sets a color having predetermined luminance for pixels (hereinafter, referred to as the "center pixels") matched with the feature points, and sets colors for several pixels surrounding each center pixel such that luminance decreases from the predetermined luminance as the distance from the center pixel increases, and sets black for the other pixels.

Further, the still-object detecting unit 64 sets the current frame image P as a reference frame image. Subsequently, the still-object detecting unit 64 shifts (rotates and translates) the feature points of the previous images acquired earlier than the reference frame image and mapped on the 3D-object arrangement map, to corresponding positions in the reference frame image, on the basis of the turning amount and movement amount of the vehicle.

Also, in a case where the movement amount of the vehicle in the Y direction (see the X-Y-Z coordinate system of FIG. 9) exceeds a predetermined amount (for example, 45 mm), the still-object detecting unit 64 updates the reference frame image with the latest frame image P.

The still-object detecting unit 64 integrates the luminance values of the 3D-object arrangement maps generated with respect to the individual frame images P, with respect to each pixel, thereby generating a final 3D-object arrangement map representing the probability that there is a feature point of a still object at each pixel (hereinafter, referred to as the certainty), by the luminance value of the corresponding pixel.

In this case, the still-object detecting unit 64 uniformly reduces the previous pixel luminance values of the individual 3D-object arrangement maps by multiplying them by $2/100$, and integrates the luminance values of each pixel, thereby suppressing the integral luminance values of pixels from reaching an upper limit before integrating is completed, thereby becoming an overflow state.

Returning to FIG. 7, the still-object detecting unit 64 generates the 3D-object arrangement map representing the position and certainty of each of the feature points of the still objects on the road surface G by the position and luminance value of a pixel other than black pixels in the map as described above, and outputs the 3D-object arrangement map to the second view point conversion unit 65 positioned at the next stage. A pixel other than black pixels in the 3D-object arrangement map is an example of a feature point of a still object.

Also, the still-object detecting unit 64 performs a process of outputting the turning amount and movement amount of the vehicle calculated in the procedure of generating the 3D-object arrangement map, to the drawing unit 5. The drawing unit 5 estimates an estimated guide line as the movement path of the vehicle, on the basis of the turning amount and movement amount of the vehicle, and generates an image of the estimated guide line.

The second view point conversion unit 65 is a processing unit of performing image development on the 3D-object arrangement map input from the still-object detecting unit 64, thereby generating a 480-by-720 pixel image, and outputting the generated image to the feature point image generating unit 42. Here, image development is a process of converting the positions of the feature points of the still objects on the road surface G (on the world coordinate system), into the positions on the frame image P as seen from the in-vehicle camera 1.

Now, with reference to FIG. 10, the background difference mode still-object-point acquiring unit 7 shown in FIG. 6 will be described. The background difference mode still-object-point acquiring unit 7 and the background difference mode moving-object-point acquiring unit 8 have the same configuration except that they are different in the movement amounts (moving velocities) of acquisition object feature points between frames. For this reason, the detailed description of the background difference mode moving-object-point acquiring unit 8 will not be made.

As shown in FIG. 10, the background difference mode still-object-point acquiring unit 7 includes a frame memory 71, a movement amount calculating unit 72, an edge detecting unit 73, and a still-object detecting unit 74. The frame memory 71 is a memory for sequentially store the frame images P input from the in-vehicle camera 1 in chronological order, and output the frame images P to the movement amount calculating unit 72.

The movement amount calculating unit 72 is a processing unit for obtaining the difference between each frame image P sequentially input from the in-vehicle camera 1 and the previous frame image P acquired from the frame memory 71, thereby generating a difference image including extracted three-dimensional objects, and outputting the difference image to the edge detecting unit 73.

Specifically, the movement amount calculating unit 72 sequentially acquires the latest frame image P (here, the current frame) from the in-vehicle camera 1, and sequentially acquires a frame image P (here, the previous frame) earlier than the current frame by one frame, from the frame memory 71.

Subsequently, the movement amount calculating unit 72 generates two view-point conversion images with respect to each of the current frame and the previous frame. First, with respect to each of the current frame and the previous frame, the movement amount calculating unit 72 generates a horizontal image of a virtual view point having a depression angle of 90°. Further, with respect to each of the current frame and the previous frame, the movement amount calculating unit 72 generates a road surface image of a virtual view point having a depression angle of 0°.

Subsequently, the movement amount calculating unit 72 designates specific rectangular areas in the horizontal images of the current frame and the previous frame, respectively, and calculates the SAD (Sum of Absolute Difference) values from the specific rectangular area of the current frame while slightly shifting the specific rectangular area of the previous frame with respect to the specific rectangular area of the current frame. The movement amount calculating unit 72 calculates the shift amount at which the SAD value is the minimum, as the perturbation amount, and calculates the turning amount of the vehicle on the basis of the calculated perturbation amount and the focal length of the in-vehicle camera 1.

Subsequently, the movement amount calculating unit 72 designates specific rectangular areas in the road surface images of the current frame and the previous frame, respectively, and aligns the specific rectangular area of the previous frame image with the specific rectangular area of the current frame on the basis of the previously calculated turning amount.

Subsequently, the movement amount calculating unit 72 calculates the SAD values from the specific rectangular area of the current frame while slightly shifting the specific rectangular area of the corrected previous frame in the X direction and Y direction of the X-Y coordinate system defined on the road surface. The movement amount calculating unit 72 calculates the shift amount at which the SAD value is the minimum, as the perturbation amount, and calculates the movement amount of the vehicle on the basis of the calculated perturbation amount and the height of the virtual view point of the road surface image. The movement amount calculating unit 72 outputs the turning amount and movement amount of the vehicle to the edge detecting unit 73 and the still-object detecting unit 74.

The edge detecting unit 73 is a processing unit for sequentially acquiring the current frame from the in-vehicle camera 1, and sequentially acquiring the previous frame from the frame memory 71, and detecting the edges of three-dimensional objects from the current frame and the previous frame, and generating edge detection images having the edge portions selectively highlighted.

In the case of generating the edge detection images, the edge detecting unit 73 performs correction for rotating and translating the previous frame on the basis of the turning amount and movement amount of the vehicle input from the movement amount calculating unit 72, in advance, thereby aligning the position and direction of the previous frame with the position and direction of the current frame. Then, the edge detecting unit 73 outputs the edge images generated with respect to the current frame and the previous frame, to the still-object detecting unit 74.

The still-object detecting unit 74 performs a difference obtaining process of obtaining the differences in the luminance values of the individual pixels between the edge image of the current frame and the edge image of the previous frame input from the edge detecting unit 73, thereby generating background difference images. In the background difference images, images of three-dimensional objects appear, but images of objects other than the three-dimensional objects do not appear.

Subsequently, the still-object detecting unit 74 detects a plurality of (for example, 200) feature points from the images of the three-dimensional objects shown in the background difference image. Subsequently, the still-object detecting unit 74 converts the positions of the feature points of the background difference image of the previous frame into positions in the coordinate system of the background difference image of the current frame, on the basis of the turning amount and movement amount of the vehicle input from the movement amount calculating unit 72, and uniformly reduces the luminance values of the individual pixels, and integrates the luminance values.

In this case, the still-object detecting unit 74 reduces the luminance values of the individual pixels by multiplying them by about ½ (in a case where the upper limit of the luminance values is 255, 128), and then integrates the luminance values, thereby generating a 480-by-720 pixel image including still-object feature points and moving-object feature points.

Also, the still-object detecting unit 74 reduces the luminance values of the individual pixels by multiplying them by about ⅛ (in a case where the upper limit of the luminance values is 255, 32), and then integrates the luminance values, thereby generating a 480-by-720 pixel image including moving-object feature points. Subsequently, the still-object detecting unit 74 deletes the moving-object feature points from the image including the still-object feature points and the moving-object feature points, thereby generating an image including the still-object feature points, and outputs the generated image to the feature point image generating unit 42.

Returning to FIG. 6, the background difference mode moving-object-point acquiring unit 8 generates a 480-by-720 pixel image including moving-object feature points in the same procedure as that of the background difference mode still-object-point acquiring unit 7, and outputs the generated image including the moving-object feature points, to the feature point image generating unit 42.

The feature point image generating unit 42 is a processing unit for compressing each 480-by-720 pixel image input from the feature point acquiring unit 41, into a 30-by-45 pixel image, thereby generating a feature point image. Now, with reference to FIG. 11, the procedure of the image compressing process of the feature point image generating unit 42 will be described.

As shown in (a) of FIG. 11, the feature point image generating unit 42 divides each 480-by-720 pixel image into 16-by-16 pixel areas, and compares the luminance values of the individual pixels of each 16-by-16 pixel area with a first luminance threshold.

For example, in a case where a 16-by-16 pixel area has three pixels having luminance values equal to or greater than the first luminance threshold as shown in (b) of FIG. 11, the feature point image generating unit 42 plots 3 which is the number of pixels having luminance values equal to or greater than the first luminance threshold, at a corresponding position in a 30-by-45 pixel area, as shown in (c) of FIG. 11.

Here, the position in the 30-by-45 pixel area where the number of pixels is plotted is a relative position which is the same as the position of the 16-by-16 pixel area in the 480-by-720 pixel image.

The feature point image generating unit 42 determines the number of pixels having luminance values equal to or greater than the luminance threshold, with respect to every 16-by-16 pixel area of the 480-by-720 pixel image, and plots the number of pixels in the 30-by-45 pixel area, thereby generating a feature point image composed of 30-by-45 pixels.

Further, the feature point image generating unit 42 binarizes the number of pixels plotted at each pixel of the generated feature point image composed of 30-by-45 pixels, by a second luminance threshold, such that each pixel having the number of pixels equal to or greater than the second luminance threshold becomes white, and each pixel having the number of pixels less than the second luminance threshold becomes black, thereby generating a feature point image composed of 30-by-45 pixels.

Further, the feature point image generating unit 42 outputs the still-object feature point images generated from the individual images input from the feature point mode still-object-point acquiring unit 6 and the background difference mode still-object-point acquiring unit 7, to the drawing unit 5. Also, the feature point image generating unit 42 outputs the moving-object feature point image generated from the image input from the background difference mode moving-object-point acquiring unit 8, to the drawing unit 5.

Returning to FIG. 5, the drawing unit 5 includes a grouping unit 51, a masking unit 52, an area dividing unit 53, a group selecting unit 54, a border image generating unit 55, and a superimposed-image generating unit 56. The grouping unit 51 is a processing unit for performing a grouping process of dividing the plurality of feature points of the three-dimensional objects such as the still objects acquired from the frame image P by the 3D-object detecting unit 4, into groups corresponding to the individual three-dimensional objects.

Also, the masking unit 52 is a processing unit of performing a masking process of excluding the feature points of some areas of the frame image P, from the plurality of feature points of the three-dimensional objects such as the still objects acquired from the frame image P by the 3D-object detecting unit 4.

Figure 12:
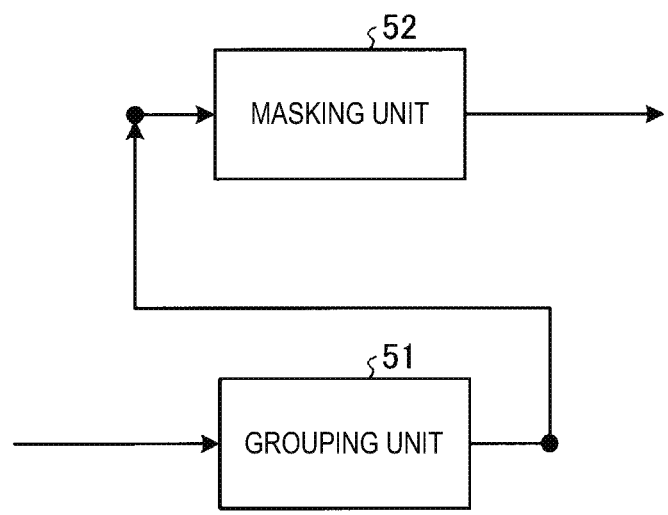
FIG. 12 is an explanatory view illustrating a processing procedure of a grouping unit and a masking unit according to the embodiment.
Figure 13:
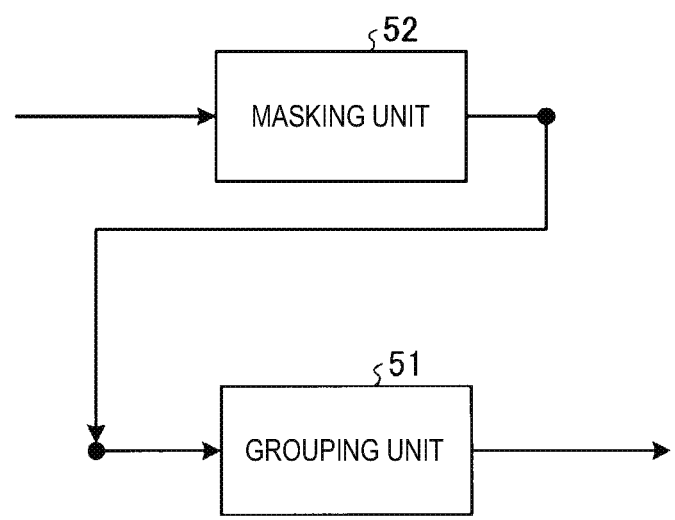
FIG. 13 is an explanatory view illustrating another processing procedure of the grouping unit and the masking unit according to the embodiment.

The processing procedure of the grouping unit 51 and the masking unit 52 varies depending on whether a three-dimensional object detected by the 3D-object detecting unit 4 is a moving object or a still object. Now, with reference to FIGS. 12 and 13, the processing procedures of the grouping unit 51 and the masking unit 52 will be described. FIGS. 12 and 13 are explanatory views illustrating the processing procedures of the grouping unit 51 and the masking unit 52 according to the embodiment.

In a case where detected three-dimensional objects are moving objects, the 3D-object detecting unit 4 outputs an image of the feature points of the detected moving objects, to the grouping unit 51. In this case, as shown in FIG. 12, the grouping unit 51 performs a grouping process of dividing the feature points of the moving objects included in the moving-object feature-point image, in groups corresponding to the individual objects, and outputting the moving-object feature-point image subjected to the grouping process, to the masking unit 52 (see (a) of FIG. 3). The masking unit 52 performs a masking process on the moving-object feature-point image subjected to the grouping process, and outputs the moving-object feature-point image subjected to the masking process (see (b) of FIG. 3).

The moving-object feature-point image output from the masking unit 52 is input to the border image generating unit 55 through the area dividing unit 53 and the group selecting unit 54. The operations of the area dividing unit 53 and the group selecting unit 54 will be described below.

The border image generating unit 55 generates border images for surrounding feature point groups included in the moving-object feature-point image sequentially subjected to the grouping process and the masking process. In this way, for example, the border image generating unit 55 can generate a border image for surrounding most of the different vehicle which is a moving object, as shown in (c) of FIG. 3, and output the border image to the superimposed-image generating unit 56. The superimposed-image generating unit 56 superimposes such border images input from the border image generating unit 55, on the frame image P input from the in-vehicle camera 1, thereby generating a superimposed image, and outputs the superimposed image to the display device 3.

Meanwhile, in a case where detected three-dimensional objects are still objects, the 3D-object detecting unit 4 outputs an image of the feature points of the detected still objects, to the masking unit 52. In this case, as shown in FIG. 13, the masking unit 52 performs a masking process on the still-object feature-point image, and outputs the still-object feature-point image subjected to the masking process, to the grouping unit 51 (see (a) of FIG. 4). The grouping unit 51 performs a grouping process on the still-object feature-point image subjected to the masking process, and outputs the still-object feature-point image subjected to the grouping process (see (b) of FIG. 4).

The still-object feature-point image output from the grouping unit 51 is input to the border image generating unit 55 through the area dividing unit 53 and the group selecting unit 54. The border image generating unit 55 generates border images for surrounding feature point groups included in the still-object feature-point image sequentially subjected to the masking process and the grouping process.

In this way, for example, as shown in (c) of FIG. 4, the border image generating unit 55 can generate a border image for surrounding most of the standing person which is a still object, and output the generated border image to the superimposed-image generating unit 56. The superimposed-image generating unit 56 superimposes such border images input from the border image generating unit 55, on the frame image P input from the in-vehicle camera 1, thereby generating a superimposed image, and outputs the superimposed image to the display device 3.

Figure 14:
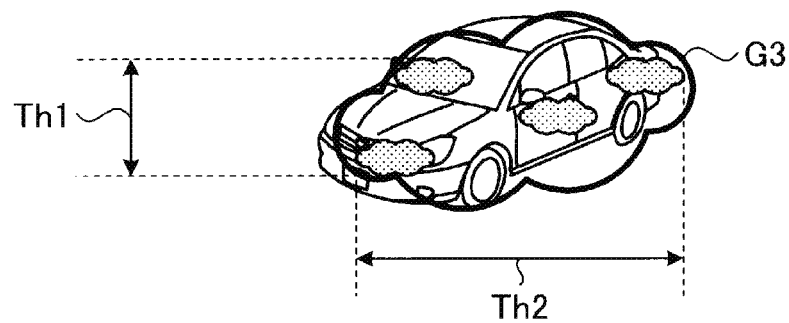
FIG. 14 is an explanatory view of thresholds for a grouping process according to the embodiment.
Figure 15:
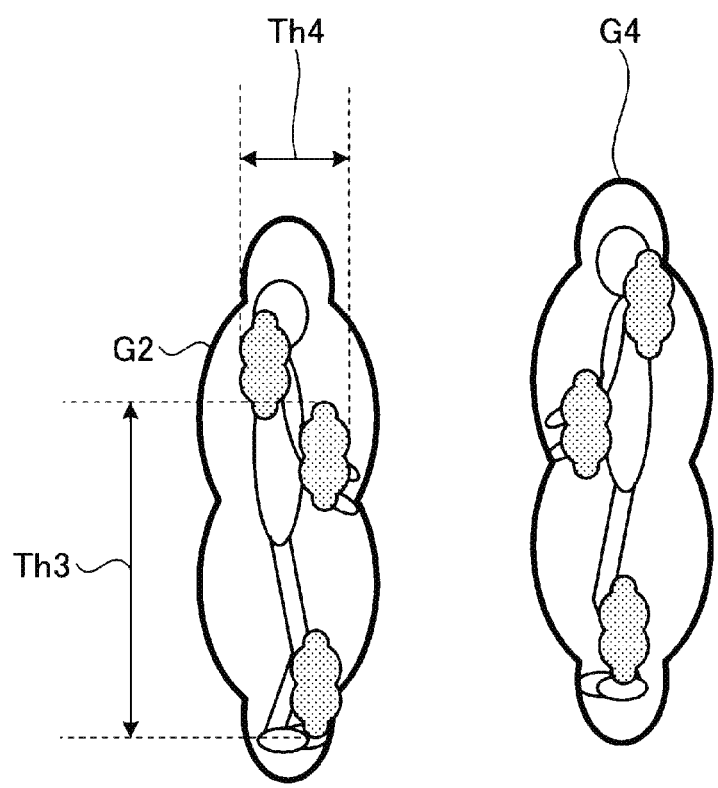
FIG. 15 is an explanatory view of other thresholds for the grouping process according to the embodiment.

Also, the grouping unit 51 uses different thresholds for the distances between feature points which should be arranged in the same group between a case of grouping the feature points of moving objects and a case of grouping the feature points of still objects. Now, with reference to FIGS. 14 and 15, the thresholds for the grouping process of the grouping unit 51 will be described. FIGS. 14 and 15 are explanatory views of the thresholds for the grouping process according to the embodiment.

As shown in FIG. 14, for example, in a case of grouping the feature points of a moving object such as a different vehicle, the grouping unit 51 makes it easy for feature points existing side by side in the left-right direction in the frame image P to be arranged in the same group, and makes it difficult for feature points existing side by side in the upward and downward direction to be arranged in the same group.

Specifically, in a case where the distance between feature points of the moving object existing side by side in the upward and downward direction in the frame image P is equal to or less than a first threshold Th1, the grouping unit 51 arranges those feature points in one group. Meanwhile, in a case where the distance between feature points of the moving object existing side by side in the left-right direction in the frame image P is equal to or less than a second threshold Th2 greater than the first threshold Th1, the grouping unit 51 arranges those feature points in one group.

For example, the grouping unit 51 uses a distance corresponding to two pixels existing side by side in the vertical direction, as the first threshold Th1, and uses a distance corresponding to three pixels existing side by side in the horizontal direction, as the second threshold Th2. In this way, in the case of the different vehicle which is a moving object, even if feature points are acquired at positions apart in the left-right direction, such as the front and rear edges of the vehicle or the left and right edges of the vehicle, the grouping unit 51 can set an area including the whole of the different vehicle and the feature points apart in the left-right direction, as an area which is occupied by the feature point group G3. Therefore, the border image generating unit 55 can generate a border image for surrounding most of the different vehicle.

Meanwhile, as shown in FIG. 15, for example, in a case of grouping the feature points of the standing person which is a still object, the grouping unit 51 makes it easy for feature points existing side by side in the horizontal direction in the frame image P to be arranged in the same group, and makes it difficult for feature points existing side by side in the left-right direction to be arranged in the same group.

Specifically, in a case where the distance between feature points of the still object existing side by side in the upward and downward direction in the frame image P is equal to or less than a third threshold Th3, the grouping unit 51 arranges those feature points in one group. Meanwhile, in a case where the distance between feature points of the still object existing side by side in the left-right direction in the frame image P is equal to or less than a fourth threshold Th4 less than the third threshold Th3, the grouping unit 51 arranges those feature points in one group.

For example, the grouping unit 51 uses a distance corresponding to four pixels existing side by side in the vertical direction, as the third threshold Th3, and uses a distance corresponding to a horizontal distance of one pixel, as the fourth threshold Th4. In this way, in the case of the person which is a still object, even if feature points are acquired at positions apart in the upward and downward direction, such as the edges of the foot and the head, the grouping unit 51 can set an area including the whole of the person and the feature points apart in the upward and downward direction, as an area which is occupied by the feature point group G2.

Therefore, the border image generating unit 55 can generate a border image for surrounding most of the person. Further, even through a feature point group G4 is acquired from another person image in the vicinity of the group G2 in the left-right direction, the grouping unit 51 does not arrange the group G2 and the group G4, in one group. Therefore, the border image generating unit 55 can generate border images for surrounding the two persons existing side by side, respectively.

Also, in a case where the vehicle reverses straightly, the masking unit 52 performs a masking process using the mask M shown in (a) of FIG. 4 and the like; however, in a case where the vehicle reverses while turning, the masking unit changes the shape of the mask M according to the estimated guide line superimposed on the frame image P.

Figure 16A:
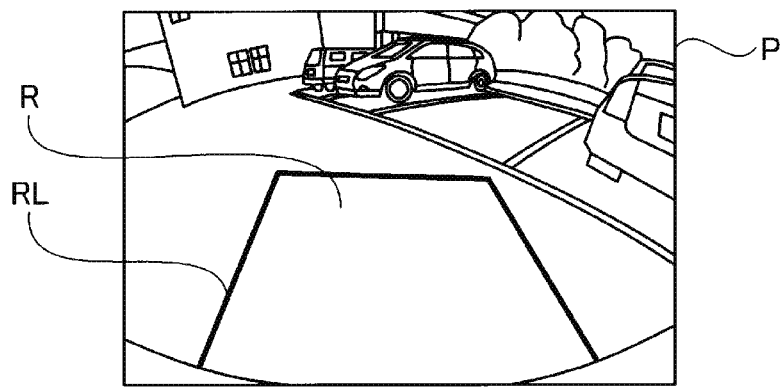
FIGS. 16A to 16C are explanatory views illustrating change in the shape of a mask according to the embodiment.
Figure 16B:
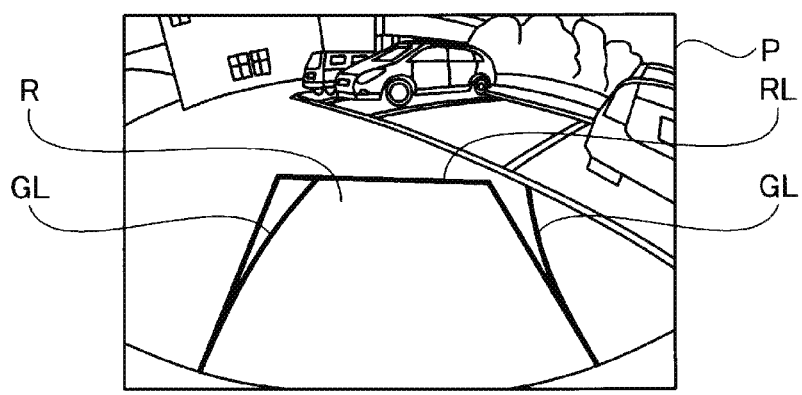
Figure 16C:
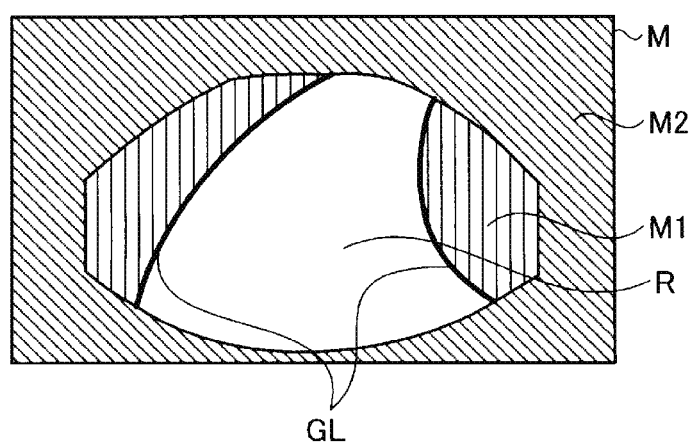

Now, with reference to FIGS. 16A to 16C, change in the shape of the mask M will be described. FIGS. 16A to 16C are explanatory views illustrating change in the shape of the mask M according to the embodiment. As shown in FIG. 16A, in a case where the vehicle reverses straightly, the superimposed-image generating unit 56 superimposes a fixed guide line RL representing an area corresponding to a center area R of the rear side of the vehicle, on the frame image P.

Also, in a case where the vehicle reverses while turning, on the basis of the turning amount of the vehicle input from the 3D-object detecting unit 4, as shown in 16B, the superimposed-image generating unit 56 further superimposes an estimated guide line GL estimated as the movement path of the vehicle, on the frame image P. Subsequently, the superimposed-image generating unit 56 outputs the display position of the estimated guide line GL in the frame image P, to the masking unit 52.

In this case, as shown in FIG. 16C, the masking unit 52 changes the boundary lines of the center area R and the side areas M1 in the mask M, as the display position of the estimated guide line GL changes. Therefore, in a case where the vehicle reverses while turning, the masking unit 52 can set the center area R from which still-object feature points and moving-object feature points are not excluded, in the area of a predetermined vehicle movement path, and remain feature points more useful for the user.

Returning to FIG. 5, the area dividing unit 53 is a processing unit of dividing the feature point image input from the grouping unit 51 or the masking unit 52, into a plurality of segment areas existing side by side in the left-right direction, and then outputting the feature point image to the group selecting unit 54. The group selecting unit 54 is a processing unit of selecting some of the feature point groups included in the feature point image divided into the plurality of segment areas and input from the area dividing unit 53, as groups which are included in the frame image P and on which border images should be superimposed.

Now, with reference to FIGS. 17 and 18, the configuration of the group selecting unit 54, and an example of the operation of the group selecting unit 54 and the area dividing unit 53 will be described. FIG. 17 is a functional block diagram illustrating the configuration of the group selecting unit 54 according to the embodiment, and FIG. 18 is an explanatory view illustrating an example of the operation of the group selecting unit 54 and the area dividing unit 53 according to the embodiment.

As shown in FIG. 17, the group selecting unit 54 includes a size determining unit 81, a group-including-area determining unit 82, and a lowest-portion determining unit 83. Here, for example, it is assumed that a feature point image P1 including five feature point groups A, B, C, D, and E as shown in (a) of FIG. 18 is input to the area dividing unit 53. Also, here, for convenience, it is assumed that the shapes of the groups A, B, C, D, and E in the feature point image P1 are rectangular shapes.

Figure 18:
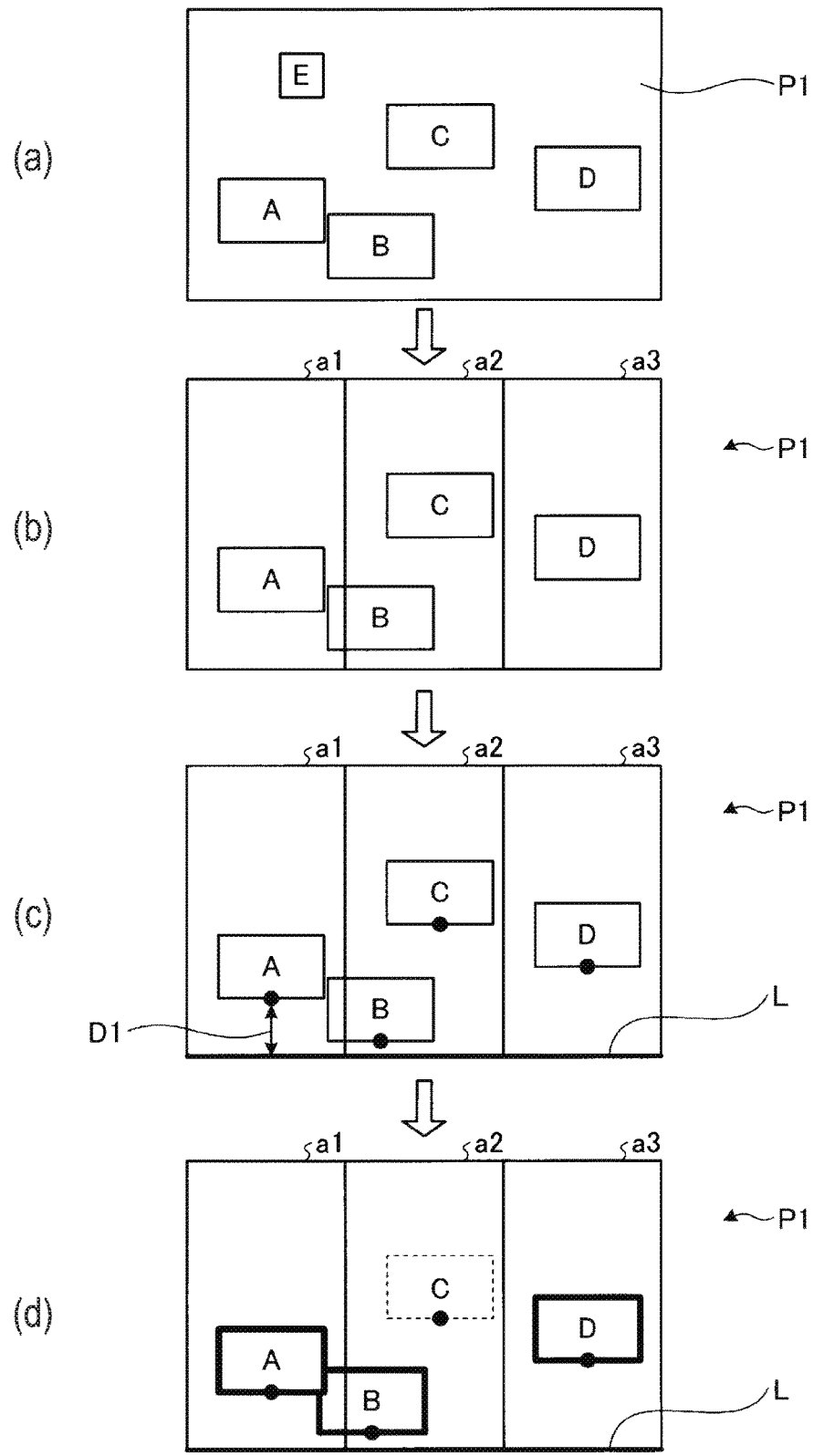
FIG. 18 is an explanatory view illustrating an example of an operation which is performed by the group selecting unit and an area dividing unit according to the embodiment.

In this case, the area dividing unit 53 divides the feature point image P1 into three segment areas a1, a2, and a3 existing side by side in the left-right direction, as shown in (b) of FIG. 18, and then outputs the feature point image to the size determining unit 81 of the group selecting unit 54.

The size determining unit 81 determines the sizes of the individual groups included in the feature point image P1 input from the area dividing unit 53, and deletes the group E smaller than a predetermined size, and then outputs the feature point image to the group-including-area determining unit 82. In this way, the size determining unit 81 can suppress existence of extremely small objects which are on the rear side of the vehicle but are less-dangerous from being uselessly notified to the user.

Subsequently, the group-including-area determining unit 82 determines which segment area each group of the feature point image P1 input from the size determining unit 81 belongs to. Specifically, first, the group-including-area determining unit 82 defines group borders for surrounding the individual groups in the feature point image P1, and determines a segment area including the coordinates of the center of the bottom of each group border, as a segment area including a group to be surrounded by the corresponding group border.

Therefore, in the example shown in (c) of FIG. 18, the group-including-area determining unit 82 determines that the group A belongs to the segment area a1, and the groups B and C belong to the segment area a2, and the group D belongs to the segment area a3. Then, the group-including-area determining unit 82 outputs the feature point image P1 having the attributes of the individual groups added thereto, to the lowest-portion determining unit 83.

With respect to each segment area, the lowest-portion determining unit 83 selects a group positioned at the lowest portion of the corresponding segment area, from groups belonging to the corresponding segment area. Specifically, the lowest-portion determining unit 83 calculates the distances between the coordinates of the centers of the bottoms of the group borders for groups of each segment area and the bottom of the feature point image P1, and determines a group to be surrounded by a group border having the shortest distance, as a group which is positioned at the lowest portion of the corresponding segment area.

For example, in the segment area a1 shown in (c) of FIG. 18, since the distance D1 from the coordinates of the center of the bottom of the group border surrounding the group A to the bottom L of the feature point image P1 is shortest, the lowest-portion determining unit 83 determines the group A as the lowest group.

In this way, the lowest-portion determining unit 83 determines that the group A is a group positioned at the lowest portion of the segment area a1, and the group B is a group positioned at the lowest portion of the segment area a2, and the group D is a group positioned at the lowest portion of the segment area a3, as shown in (d) of FIG. 18. Subsequently, the lowest-portion determining unit 83 outputs information on the positions of the group borders for the lowest groups of the individual segment areas in the feature point image P1, to the border image generating unit 55.

Returning to FIG. 5, the border image generating unit 55 generates border images to be superimposed on the frame image P, on the basis of the information on the positions of the group borders in the feature point image input from the group selecting unit 54, and outputs the border images to the superimposed-image generating unit 56.

The superimposed-image generating unit 56 superimposes the border images input from the border image generating unit 55, on the frame image P, thereby generating a superimposed image, and outputs the superimposed image to the display device 3. Further, the superimposed-image generating unit 56 superimposes even images of the fixed guide line, the estimated guide line, and the like described above, on the frame image P.

In this way, the image processing device 2 can provide the superimposed image including three-dimensional objects included in three segment areas of the frame image P existing side by side in the left-right direction, and closest to the vehicle, and surrounded by the border images, to the user. Therefore, the image processing device 2 can improve the quality of information for notifying existence of three-dimensional objects to the user, for example, as compared to other image processing devices which surround only a three-dimensional object of a frame image P closest to a vehicle by a border image.

Figure 19:
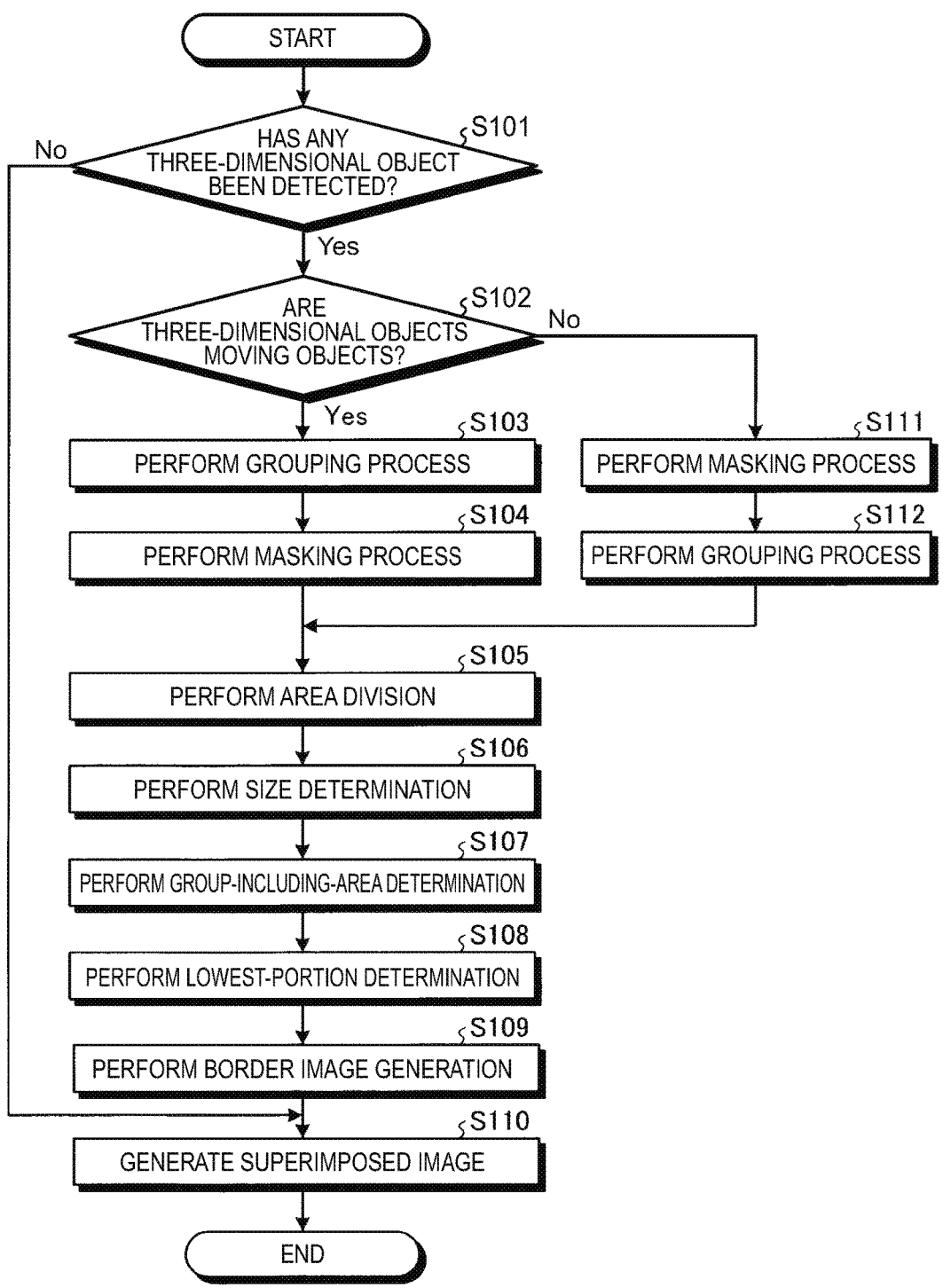
FIG. 19 is a flow chart illustrating processing which is performed by the image processing device according to the embodiment.

Now, with reference to FIG. 19, processing which is performed by the image processing device 2 will be described. FIG. 19 is a flow chart illustrating processing which is performed by the image processing device 2 according to the embodiment. The image processing device 2 repeatedly performs the processing of FIG. 19 at predetermined intervals, for example, while the shift lever of the vehicle is at the R position.

If the shift lever of the vehicle is shifted into the R position, as shown in FIG. 19, in STEP S101, the image processing device 2 determines whether any three-dimensional object has been detected from a frame image P. In a case of determining that any three-dimensional object has not been detected ("No" in STEP S101), the image processing device 2 advances the processing to STEP S110 in which the image processing device superimposes a fixed guide line and an estimated guide line on the frame image P, thereby generating a superimposed image, and outputs the superimposed image to the display device 3. Then, the image processing device finishes the processing.

Meanwhile, in a case of determining that some three-dimensional objects have been detected ("Yes" in STEP S101), in STEP S102, the image processing device 2 determines whether the detected three-dimensional objects are moving objects or not. In a case of determining that the three-dimensional objects are moving objects ("Yes" in STEP S102), the image processing device 2 performs a grouping process on a feature point image of the three-dimensional objects in STEP S103, and performs a masking process on the feature point image in STEP S104, and advances the processing to STEP S105.

Meanwhile, in a case of determining that the detected three-dimensional objects are not moving objects ("No" in STEP S102), the image processing device 2 determines that the three-dimensional objects are still objects, and performs a masking process on the feature point image of the three-dimensional objects in STEP S111, and performs a grouping process on the feature point image in STEP S112, and advances the processing to STEP S105.

In STEP S105, the image processing device 2 performs area division, thereby dividing the feature point image into a plurality of segment areas. Subsequently, in STEP S106, the image processing device determines the sizes of feature point groups included in the feature point image. In a case where some of the feature point groups are smaller than a predetermined size, the image processing device 2 deletes the corresponding groups from the feature point image, and advances the processing to STEP S107.

In STEP S107, the image processing device 2 performs group-including-area determination, thereby determining which segment area each feature point group of the feature point image belongs to. Subsequently, in STEP S108, with respect to each segment area, the image processing device performs lowest-portion determination, thereby determining a group positioned at the lowest portion.

Subsequently, in STEP S109, the image processing device 2 performs border image generation, thereby generating border images for surrounding the groups positioned at the lowest portions in the individual segment areas. Subsequently, the image processing device 2 superimposes the border images on the frame image P, thereby generating a superimposed image, in STEP S110, and outputs the superimposed image, and finishes the processing.

The above described embodiment is an example, and the configuration and operation of the image processing device 2 according to the present invention is not limited to the above described embodiment. Hereinafter, modifications of the image processing device 2 according to the embodiment will be described.

FIGS. 20 to 23 are explanatory views illustrating image processing methods of image processing devices according to first to fourth modifications of the embodiment. In the embodiment, the case where the image processing device performs image processing on a moving-object feature-point image, in the order of a grouping process and a masking process, and performs image processing on a still-object feature-point image, in the order of a masking process and a grouping process has been described as an example. However, this is an example.

Figure 20:
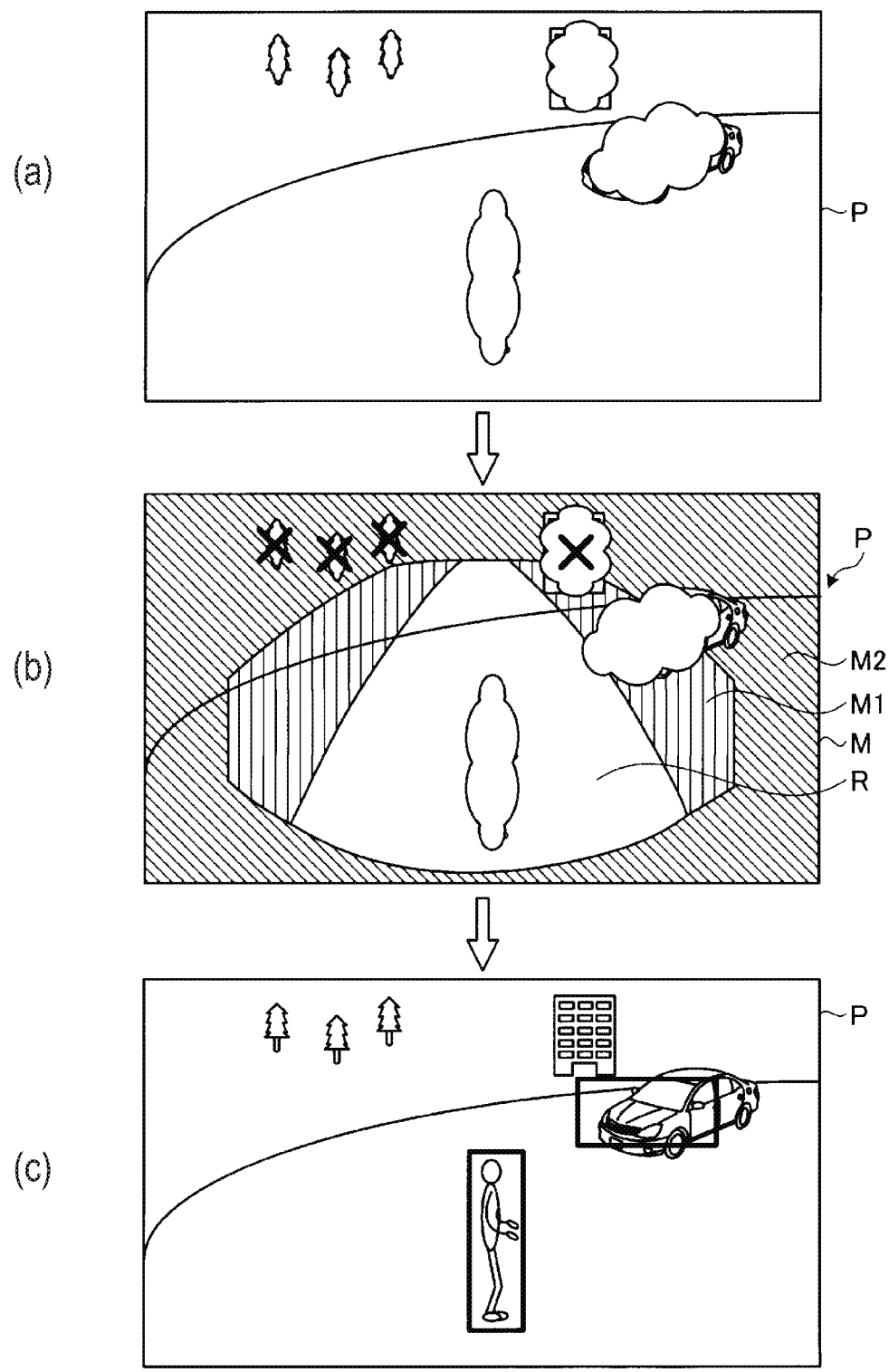
FIG. 20 is an explanatory view illustrating an image processing method of an image processing device according to a first modification of the embodiment.

For example, an image processing device of a first modification can perform a grouping process on the feature points of the moving object and the still objects as shown in (a) of FIG. 20, and perform a masking process on the feature points subjected to the grouping process as shown in (b) of FIG. 20. Even according to the image processing method of the present modification, as shown in (c) of FIG. 20, it is possible to superimpose a border image for surrounding most of the different vehicle which is the moving object, on the frame image P.

Also, in the above described embodiment, the image processing device divides the feature point image into the plurality of segment areas, and selects the lowest groups of the individual segment areas, as groups to be surrounded by border images. However, the number of groups which are surrounded by border images is not limited to only one for each segment area.

For example, an image processing device of a second modification may further include a lower-area setting unit for setting an area from the bottom of a group border for surrounding a group positioned at the lowest portion of each of the segment areas of the feature point image to a position apart from the bottom of the corresponding group border toward the top of the feature point image by a predetermined distance, as a lower area.

Figure 21:
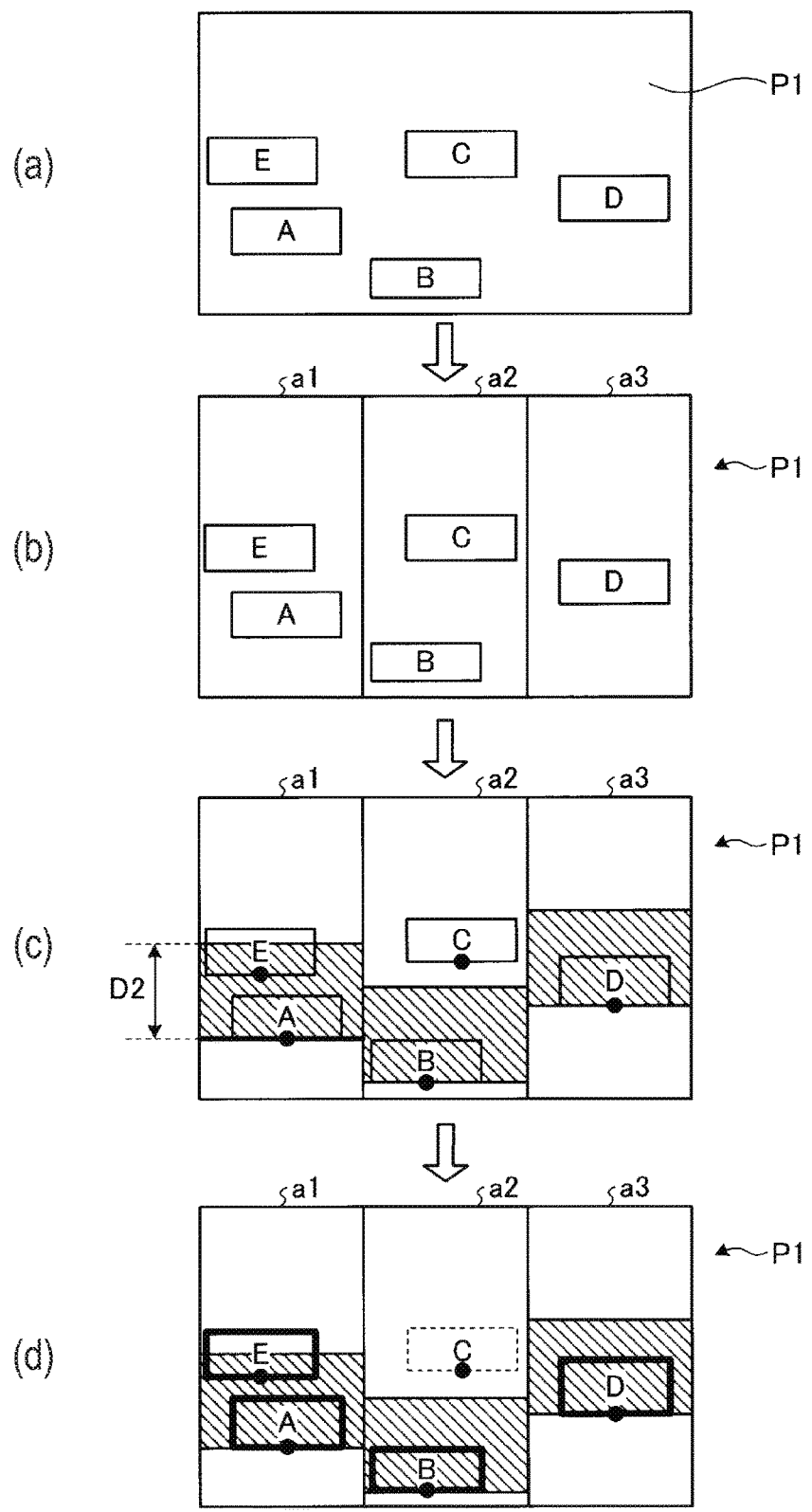
FIG. 21 is an explanatory view illustrating an image processing method of an image processing device according to a second modification of the embodiment.

In a case of generating a feature point image P1 shown in (a) of FIG. 21, the image processing device of the present modification first divides the feature point image P1 into three segment areas a1, a2, and a3. Subsequently, with respect to each of the segment areas a1, a2, and a3, the lower-area setting unit of the image processing device sets an area from the bottom of a group border positioned at the lowest portion to a position apart from the bottom of the group border toward the top of the feature point image by a predetermined distance D2, as a lower area.

Subsequently, the group selecting unit of the image processing device selects groups to be surrounded by group borders having the bottoms having the center coordinates in the individual lower areas, as groups positioned at the lowest portions. In this way, with respect to the segment area a1, as shown in (d) of FIG. 21, the image processing device can select two groups A and E, as groups to be surrounded by border images.

For example, in a case where a three-dimensional object corresponding to the group A is a still object, and a three-dimensional object corresponding to the group E is a moving object approaching the vehicle, the image processing device of the present modification can surround the moving object corresponding to the group E requiring more attention than the group A, by a border image, thereby notifying existence of the moving object to the user.

Figure 22:
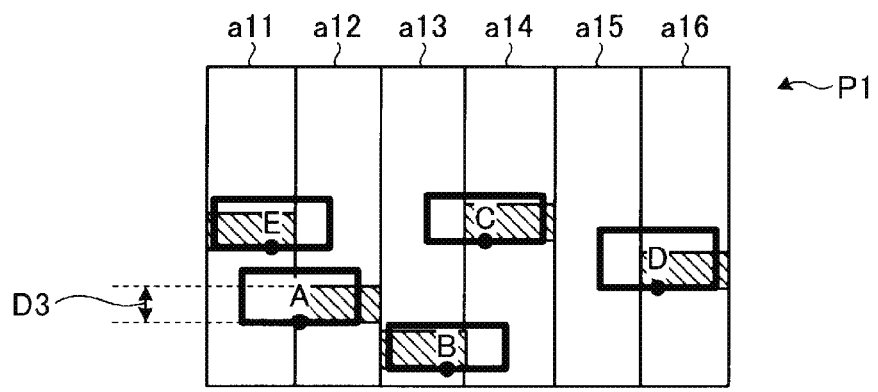
FIG. 22 is an explanatory view illustrating an image processing method of an image processing device according to a third modification of the embodiment.

Also, an image processing device of a third modification further includes an area dividing unit in which the number of segment areas is variable depending on each feature point image, and a lower-area setting unit in which the lower-area size described above is variable. For example, as shown in FIG. 22, the image processing device of the present modification can divide a feature point image into four or more (here, six) segment areas a11, a12, a13, a14, a15, and a16 existing side by side in the left-right direction. Therefore, the image processing device can surround more three-dimensional objects close to the vehicle and dangerous, by border images, thereby notifying existence of the three-dimensional objects to the user.

However, in a case where the number of segment areas of a feature point image is increased by the area dividing unit, the image processing device reduces a predetermined distance D3 from the bottom to top of each lower area by the lower-area setting unit. In this way, the image processing device can suppress an excessively large amount of border image information from being provided to the user while surrounding more three-dimensional objects close to the vehicle and dangerous by border images, thereby notifying existence of the dangerous three-dimensional objects to the user.

Also, in a case where the number of segment areas of a feature point image is decreased by the area dividing unit, the image processing device increases the predetermined distance D3 from the bottom to top of each lower area. In this way, the image processing device reduces the number of segment areas of the feature point image, thereby suppressing an excessively large number of dangerous three-dimensional objects from being notified to the user.

Figure 23:
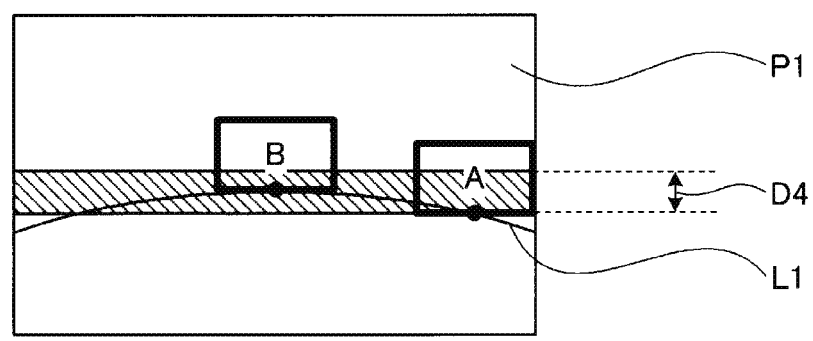
FIG. 23 is an explanatory view illustrating an image processing method of an image processing device according to a fourth modification of the embodiment.

Also, in the image processing device, the area dividing unit can be omitted. An image processing device of a fourth modification includes the lower-area setting unit described above. As shown in FIG. 23, the image processing device of the fourth modification sets an area from the bottom of a group border for surrounding a feature point group A positioned at the lowest portion of a feature point image, to a position apart from the bottom of the group border toward the top of the feature point image by a predetermined distance D4, as a lower area.

In this case, in the feature point image, due to the wide-angle lens of the in-vehicle camera 1, objects equidistant from the vehicle are shown at positions different in the distance in the upward and downward direction, and the lower-area setting unit sets the maximum distance in the upward and downward direction, as the predetermined distance D4. Also, in the feature point image of FIG. 23, pixel positions corresponding to positions apart from the vehicle by the same distance as the distance from the vehicle to a three-dimensional object corresponding to the group A is shown by an arc L1.

According to the image processing device of the fourth modification, in the feature point image, even a three-dimensional object corresponding to a group B positioned upper than the group A and apart from the vehicle by the same distance as the distance of the three-dimensional object corresponding to the group A from the vehicle can be surrounded by a border image.

Also, the image processing device may include a correcting unit for correcting feature point image distortion attributable to the wide-angle lens of the imaging device. In this case, the group selecting unit of the image processing device selects a group positioned at the lowest portion of each segment area, on the basis of the feature points subjected to distortion correction by the correcting unit. Therefore, the image processing device can detect a three-dimensional object closest to the vehicle, from each segment area, with a higher degree of accuracy.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a controller configured to function as:
      a feature point acquiring unit configured to acquire a plurality of feature points of objects of each frame image, from frame images sequentially input from an imaging device;
      a grouping unit configured to perform a grouping process of dividing the plurality of input feature points into groups corresponding to individual objects, and then output the feature points;
      a masking unit configured to perform a masking process of excluding feature points included in some areas of the frame image, from the plurality of input feature points, and output feature point groups;
      a highlighting-image generating unit configured to generate highlighting images for highlighting objects of the frame image corresponding to the feature point groups if the feature point acquiring unit inputs the feature points to the grouping unit, and the grouping unit outputs the feature points to the masking unit, and the masking unit outputs the feature point groups to the highlighting-image generating unit; and
      a superimposed-image generating unit configured to superimpose the highlighting images generated by the highlighting-image generating unit, on the frame image, thereby generating a superimposed image, and output the superimposed image.

2. The image processing device according to claim 1, wherein the feature point acquiring unit includes a moving-object-point acquiring unit configured to acquire the feature points of moving objects from the plurality of feature points of the objects, and wherein the moving-object-point acquiring unit inputs the feature points of the moving objects to the grouping unit.

3. The image processing device according to claim 2, wherein in a case where the distance between moving-object feature points existing side by side in an upward and downward direction in the frame image is equal to or less than a first threshold, the grouping unit arranges the corresponding feature points in one group, and in a case where the distance between moving-object feature points existing side by side in a left-right direction in the frame image is equal to or less than a second threshold greater than the first threshold, the grouping unit arranges the corresponding feature points in one group.

4. The image processing device according to claim 1, wherein in a case where the feature point acquiring unit inputs the feature points to the masking unit, and the masking unit outputs the feature points to the grouping unit, and the grouping unit outputs feature point groups, the highlighting-image generating unit generates highlighting images for highlighting objects of the frame image corresponding to the feature point groups.

5. The image processing device according to claim 4, wherein the feature point acquiring unit includes a still-object-point acquiring unit configured to acquire the feature points of still objects from the plurality of feature points of the objects, and wherein the still-object-point acquiring unit inputs the feature points of the still objects to the masking unit.

6. The image processing device according to claim 5, wherein in a case where the distance between still-object feature points existing side by side in an upward and downward direction in the frame image is equal to or less than a third threshold, the grouping unit arranges the corresponding feature points in one group, and in a case where the distance between still-object feature points existing side by side in a left-right direction in the frame image is equal to or less than a fourth threshold smaller than the third threshold, the grouping unit arranges the corresponding feature points in one group.

7. The image processing device according to claim 5, wherein the superimposed-image generating unit superimposes an estimated movement line image representing the left and right ends of an estimated movement area of a vehicle having the imaging device mounted thereon, on the frame image, and wherein the masking unit performs:

a masking process of excluding the feature points of still objects included outside the estimated movement area, from the input frequency points; and a masking process of excluding the feature points of moving objects included in areas apart outward in a left-right direction from the left and right ends of the estimated movement area by a predetermined distance, from the input feature points.

8. The image processing device according to claim 7, wherein the superimposed-image generating unit superimposes the estimated movement line image which curves according to the turning amount of the vehicle, on the frame image.

9. An image processing method comprising:

allowing a feature point acquiring unit to acquire a plurality of feature points of objects of each frame image, from frame images sequentially input from an imaging device;

allowing a grouping unit to perform a grouping process of dividing the plurality of input feature points into groups corresponding to individual objects, and then output the feature points;

allowing a masking unit to perform a masking process of excluding feature points included in some areas of the frame image, from the plurality of input feature points, and output feature point groups;

allowing a highlighting-image generating unit to generate highlighting images for highlighting objects of the frame image corresponding to the feature point groups if the feature point acquiring unit inputs the feature points to the grouping unit, and the grouping unit outputs the feature points to the masking unit, and the masking unit outputs the feature point groups to the highlighting-image generating unit; and allowing a superimposed-image generating unit to superimpose the highlighting images generated by the highlighting-image generating unit, on the frame image, thereby generating a superimposed image, and output the superimposed image.

\* \* \* \* \*